(12) United States Patent
Suzuki et al.

(10) Patent No.: US 7,379,788 B1
(45) Date of Patent: May 27, 2008

(54) MANUFACTURED ARTICLE TREATMENT PROCESSING SYSTEM

(75) Inventors: Tatsuya Suzuki, Yokohama (JP); Toshijiro Ohashi, Chigasaki (JP); Yuzo Hiroshige, Tokyo (JP); Yuji Ochiai, Tokyo (JP); Takashi Kitamura, Abiko (JP); Takahiro Tachi, Funabashi (JP); Masakatsu Hayashi, Ushiku (JP)

(73) Assignee: Hitachi, Ltd., Tokyo (JP)

( * ) Notice: Subject to any disclaimer, the term of this patent is extended or adjusted under 35 U.S.C. 154(b) by 965 days.

(21) Appl. No.: 09/621,054

(22) Filed: Jul. 21, 2000

Related U.S. Application Data

(63) Continuation of application No. 09/091,192, filed on Jun. 10, 1998, now Pat. No. 6,226,617.

(51) Int. Cl.
*G06F 7/00* (2006.01)
*G06F 19/00* (2006.01)
*G06F 9/46* (2006.01)
*B03B 7/00* (2006.01)

(52) U.S. Cl. .................. 700/219; 700/116; 209/12.1; 705/8

(58) Field of Classification Search .............. 705/1, 705/8, 9, 400, 7, 11, 28, 29; 707/104.1; 209/3.3, 209/630, 3.1, 3.2, 4, 10, 11, 12.1, 930, 509, 209/606; 235/335, 376, 385; 700/95, 106, 700/115, 213, 266, 116, 219; 29/426.1, 426.3, 29/426.2, 426.4, 426.5, 426.6, 700, 701, 29/703, 705, 791, 712; 702/82
See application file for complete search history.

(56) References Cited

U.S. PATENT DOCUMENTS

| 4,839,061 | A |   | 6/1989 | Manchak, Jr. et al. ...... 210/743 |
| 5,042,403 | A | * | 8/1991 | Reed et al. ................. 110/346 |
| 5,072,833 | A |   | 12/1991 | Hansen et al. ............... 209/3.3 |
| 5,560,100 | A | * | 10/1996 | Englert ........................ 29/833 |
| 5,654,902 | A | * | 8/1997 | Scheidt et al. ................. 702/82 |
| 5,664,112 | A |   | 9/1997 | Sturgeon et al. .............. 705/28 |
| 5,712,990 | A | * | 1/1998 | Henderson et al. ........... 705/28 |

(Continued)

FOREIGN PATENT DOCUMENTS

DE    4312180 A1 * 10/1994

(Continued)

OTHER PUBLICATIONS

Puskar: "Russian roulette with fluid disposal. (improper disposal of hydraulic fluid in effluent system)"; Hydraulics & Pneumatics Apr. 1982, v45, n4, p. 33.*

(Continued)

*Primary Examiner*—Igor N. Borissov
(74) *Attorney, Agent, or Firm*—Antonelli, Terry, Stout & Kraus, LLP.

(57) ABSTRACT

A manufactured article treatment processing method and system includes reading out from a manufactured article being subjected to treatment information of component parts of the article and specific properties of the component parts, extraction of the component parts to be separated on the basis of predetermined specific properties serving as information for detachment and specific properties of the component parts, and treatment of the component parts to be separated and other components parts through different processes, respectively.

3 Claims, 33 Drawing Sheets

U.S. PATENT DOCUMENTS

| | | | | |
|---|---|---|---|---|
| 5,965,858 A | * | 10/1999 | Suzuki et al. | 235/375 |
| 6,157,902 A | * | 12/2000 | Hirata et al. | 703/7 |
| 6,226,617 B1 | * | 5/2001 | Suzuki et al. | 705/1 |
| 6,246,919 B1 | * | 6/2001 | Hassel | 700/116 |
| 6,483,581 B1 | * | 11/2002 | Ben-Amotz et al. | 356/301 |
| 6,633,795 B1 | * | 10/2003 | Suzuki et al. | 700/213 |

FOREIGN PATENT DOCUMENTS

| | | | |
|---|---|---|---|
| EP | 386443 A2 | * | 9/1990 |
| JP | 2-15949 | | 1/1990 |
| JP | 5-324778 | | 12/1993 |
| JP | 6-245256 | | 9/1994 |
| JP | 6-246256 | | 9/1994 |
| JP | 7-303873 | | 11/1995 |
| JP | 7-334583 | | 12/1995 |
| JP | 8-323337 | | 12/1996 |
| WO | WO 95/28680 | * | 10/1995 |
| WO | WO 97/05577 | * | 2/1997 |

OTHER PUBLICATIONS

Schaffer: "USEPA Mulls Additional Rulemaking Regarding Treatment, Disposition of Soiled Shop Towels"; Printing News, Sep. 6, 1999, vol. 143, No. 10, p. 19.*

* cited by examiner

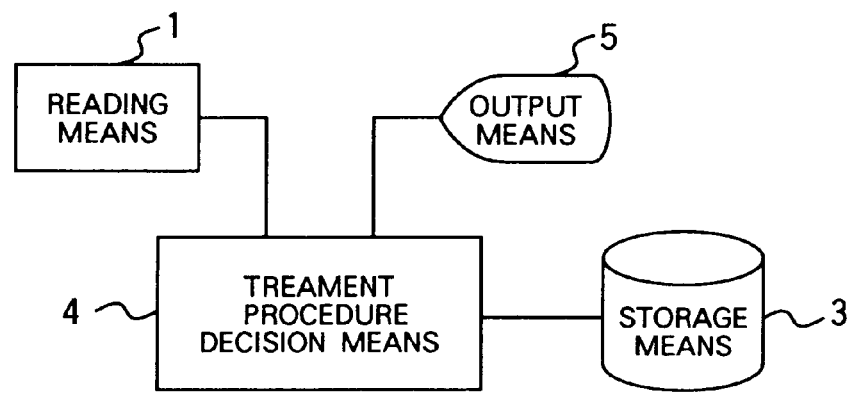
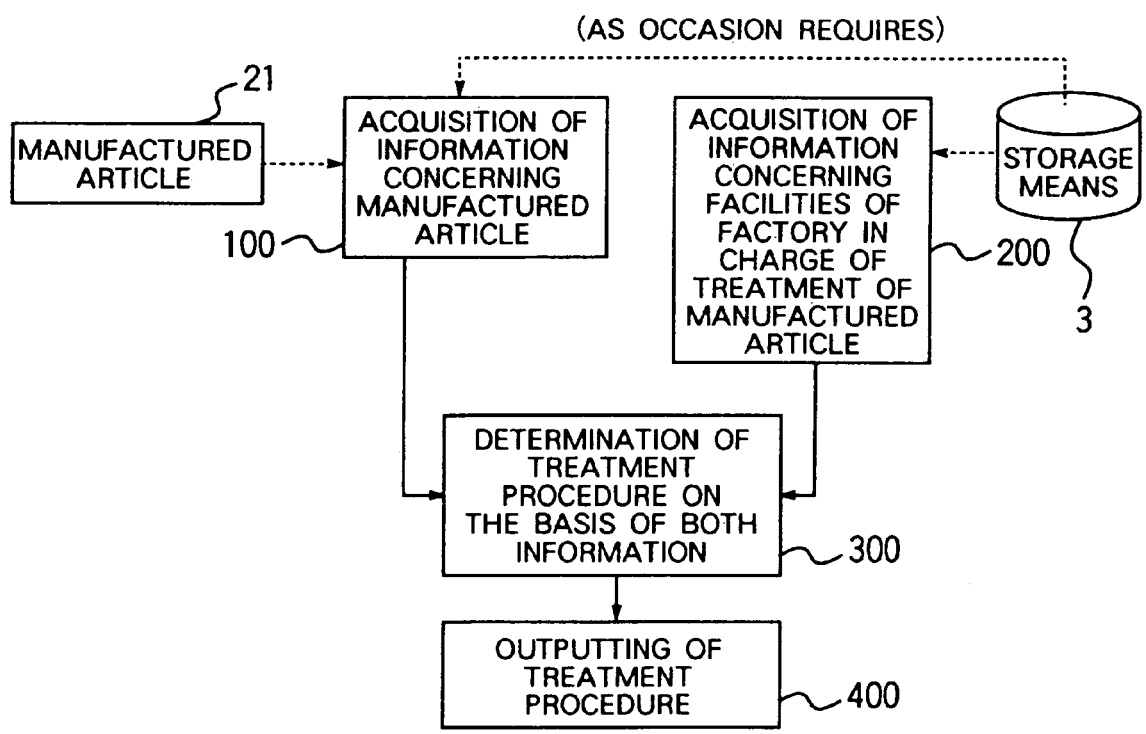

FIG. 9

EXAMPLE OF DATA OF MANUFATURED ARTICLE SPECIFICATIONS INFORMATION

ADDRESS HEADER

| ADDRESS | HEADER ENTRY | DATA SIZE |
|---|---|---|
| A | BASIC INFORMATION | 50 |
| B | DESIGN INFORMATION (1) | 50 |
| C | DESIGN INFORMATION (2) COMPONENT PART INFORMATION | 40000 |
| D | DESIGN INFORMATION (3) DISASSEMBLING METHOD INFORMATION | 1000 |
| E | | |

DATA FIELD

A

| ARTICLE CATEGORY | MANUFACTURER NAME | MODEL NAME | MANUFACTURE ID NUMBER | MANUFACTURE DATE | RECYCLE-ALLOWABLE LIFE LIMIT |
|---|---|---|---|---|---|
| CTV | HITACHI | C29ABC | 000205 | 198902 | 3 |

B

| SCREEN SIZE | OUTER DIMENSIONS (W) | (H) | (D) | WEIGHT | DISSIPATION POWER |
|---|---|---|---|---|---|
| 29 | 500 | 500 | 450 | 40.0 | 120 |

C

| PART NUMBER | PART NAME | CATEGORY | MATERIALS/ SUBSTANCES NAME | MATERIAL/ PART MANUFACTURER | MATERIAL/ PART GRADE | WEIGHT | REUSE-DESTINED NUMBER | USE-HISTORY (YEARS) | PART EXCHANGE DATE |
|---|---|---|---|---|---|---|---|---|---|
| 1 | BEZEL | P | PS | ABC | PS10 | 2000 | 1 | 0 | 0 | 0000 |
| 2 | COVER | P | PS | ABC | PS30 | 3000 | 1 | 0 | 0 | 0000 |
| 3 | PWB ASSY | PWB | Pb+Cu+e.t.c | — | A55 | 3500 | 1 | 0 | 0 | 0000 |
| 4 | HOLDER | P | PS | DEF | B60 | 200 | 1 | 0 | 0 | 0000 |
| 5 | CRT | CO | Pb+Glass | HIT | C29A | 20000 | 1 | 1 | 0 | 0000 |
| 6 | DY | CO | PPE+Cu | HM | DY29 | 600 | 1 | 1 | 0 | 9205 |
| 7 | CABLE | CO | PVC+Cu | HD | CA100 | 300 | 10 | 0 | 3 | 0000 |
| 8 | SPEAKER | CO | — | NC | SP10 | 1000 | 2 | 1 | 0 | 0000 |
| 9 | S.METAL | M | Fe | NS | SECC | 400 | -2 | 1 | 0 | 0000 |

FIG. 10

EXAMPLE OF MARKET INFOFMATION DATABASE

[ADDRESS HEADER (1)]

| ADDRESS | ENTRY |
|---|---|
| A | MARKET PRICE INFORMATION OF USED-ARTICLES |
| B | DEMAND INFORMATION OF USED-PARTS |

[ADDRESS HEADER (2) (ARTICLE-CATEGORY BASED)]

| A01 | COLOR TELEVISION |
|---|---|
| A02 | REFRIGERATOR |
| A03 | AIR-CONDITIONER |

[USED-ARTICLE MARKET PRICE INFORMATION DATA]

| | ARTICLE MODEL NAME | MANUFACTURE STANDARD YEAR | MARKET PRICE |
|---|---|---|---|
| 01 | C29ABC1 | 90 | 3000 |
| 02 | C29ABC1 | 91 | 5000 |
| 03 | C25DEF2 | 90 | 2000 |

[ADDRESS HEADER (2) (ARTICLE-CATEGORY BASED)]

| B01 | COLOR TELEVISION |
|---|---|
| B02 | REFRIGERATOR |

[DATA OF USED-PART DEMAND INFORMATION]

| PART TYPE | PART CATEGORY | MANUFACTURE YEAR | DEMANDED NUMBER | PURCHASE PRICE | BUYER |
|---|---|---|---|---|---|
| DY100 | DEFLECTING YOKE | 90 | 10 | 300 | SERVICE CENTER A |
| CRTC29F | CRT | 91 | 3 | 3000 | SERVICE CENTER B |

FIG. 11

(EXAMPLE OF TREATMENT-ENTRUSTED FACTORY SPECIFICATIONS INFORMATION)

[FACTORY NAME : FACTORY A]
(ADDRESS HEADER)
ADDRESS

| A | FACILITIES INFORMATION | |
|---|---|---|
| B | TREATMENT WORK COST INFORMATION | |
| C | | |

(A : FACILITIES INFORMATION)

| 1.CRUSHER | | | | |
|---|---|---|---|---|
| NO | NAMES | TREATMENT-DESTINED OBJECT | TREATABLE OBJECT SIZE | TREATMENT COSTS |
| 1 | ORDINARY SHREDDER | EXCLUSIVE OF HARMFUL/ HAZARDOUS MATERIALS/ SUBSTANCES AND METAL BLOCKS | 300×300×300 (mm) | 100 YEN/MIN |
| 2 | SHREDDER FOR METAL BLOCKS | METAL BLOCKS | 300×300×300 (mm) | 200 YEN/MIN |

| 2.CUTTER | | | | |
|---|---|---|---|---|
| NO | NAMES | TREATMENT-DESTINED OBJECT | TREATABLE OBJECT SIZE | TREATMENT COSTS |
| 1 | CUTTER | EXCLUSIVE OF HARMFUL/ HAZARDOUS MATERIALS/ SUBSTANCES AND METAL BLOCKS | 1000×1000×1000 (mm) | 50 YEN/MIN |

(B : TREATMENT WORK COST)

| 1.DETACHMENT OF SCREW | | | |
|---|---|---|---|
| NO | TYPES (NAMES) | COST | |
| 1 | M3×10 | 3YEN | |
| 2 | M3×16 | 4YEN | |

| 2.LIFTING ( ↑ ) | | | |
|---|---|---|---|
| NO | WEIGHT | MAXIMUM LENGTH | COST |
| 1 | ~1Kg | ~500mm | 2YEN |

| ○.CUTTER | | | |
|---|---|---|---|
| NO | CUT SURFACE DIMENSION | COST | |
| 1 | ~10000cm$^2$ | 2YEN | |
| 2 | ~20000cm$^2$ | 5YEN | |

| ○.DETACHING OF SNAP-FIT ⊕ LIFTING ( ↑ S) | | | |
|---|---|---|---|
| NO | — | COST | |
| 1 | PER LOCATION | 5yen | |

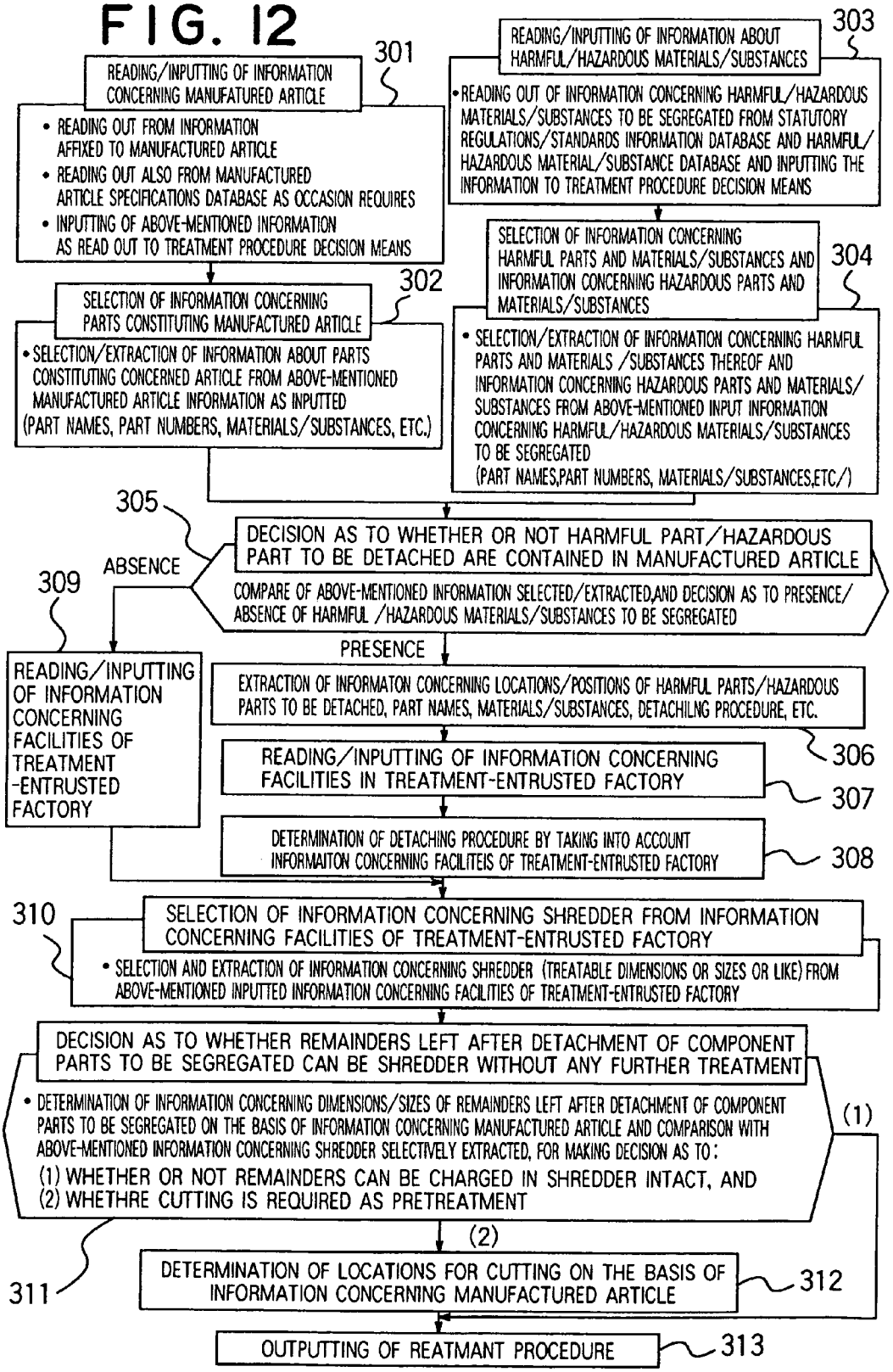

FIG. 13

321 — READING/INPUTTING OF INFORMATION CONCERNING MANUFATCURED ARTICLE
- READING OUT FROM INFORMATION AFFIXED TO MANUFACTURED ARTICLE
- READING OUT ALSO FROM MANUFACTURED ARTICLE SPECIFICATIONS DATABASE AS OCCASION REQUIRES
- INPUTTING OF ABOVE-MENTIONED INFORMATION AS READ OUT TO TREATMENT PROCEDURE DECISION MEANS

323 — READING/INPUTTING OF INFORMATION CONCERNING FACILITIES OF TREATMENT-ENTRUSTED FACTORY
- READING OF INFORMATION CONCERNONG FACILITIES OF TREATMENT-ENTRUSTED FACTORY FROM TREATMENT-ENTRUSTED FACTORY SPECIFICATIONS DATABASE AND INPUTTING TO TREATMENT PROCEDURE DECISION MEANS

322 — SELECTION OF INFORMATION CONCERNING PARTS CONSTITUTING MANUFACTURED ARTICLE
- SELECTION/EXTRACTION OF INFORMATION ABOUT PARTS CONSTITUTING CONCERNED ARTICLE FROM ABOVE-MENTIONED MANUFACTURED ARTICLE INFORMATION AS INPUTTED (PART NAMES, PART NUMBERS, MATERIALS/SUBSTANCES, ETC.)

324 — SELECTION OF CONDITIONS OF TREATMENT-DESTINED OBJECTS FOR FACILITIES OF TREATMENT-ENTRUSTED FACTORY
- SELECTION/EXTRACTION OF CONDITIONS OF TREATMENT-DESTINED OBJECTS FOR FACILITIES IN TREATMENT-ENTRUSTED FACTORY FROM ABOVE-MENTIONED INPUTTED INFORMATION CONCERNING FACILITIES OF TREATMENT-ENTRUSTED FACTORY (PART NAMES,MATERIALS/SUBSTANCES,ETC.)
- EXAMPLI : METAL BLOCK (WHICH CAN NOT BE SHREDDED BY ORDINARY SHREDDER)

325 — DECISION AS TO WHETHER COMPONENT PARTS TO BE SEPARATED IS CONTAINED IN MANUFACTURED ARTICLE
- COMPARISON OF ABOVE INFOMATION CONCERNING COMPONENT PARTS EXTRACTED SELECTIVELY WITH INFORMATION CONCERNING FACILITIES OF TREATMENT-ENTRUSTED FACTORY FOR DETERMINING DETERMINATION OF PRESENCE/ABSENCE OF COMPONENT PARTS TO BE SEPARATED

ABSENCE / PRESENCE

326 — EXTTRACTION OF INFORMATION CONCERNING LOCATIONS/POSITONS OF COMPONENT PARTS TO BE SEPARATED, PART NAMES, MATERIALS/SUBSTANCES, SEPARATING PROCEDURE, ETC.

327 — DETERMINATION OF SEPARATING PROCEDURE BY TAKING INTO ACCOUNT INFORMAITON CONCERNING FACILITIES OF TREATMENT-ENTRUSTED FACTORY

328 — SELECTION OF INFORMATION CONCERNING SHREDDER FROM INFORMATION CONCERNING FACILITIES OF TREATMENT-ENTRUSTED FACTORY
- SELECTION AND EXTRACTION OF INFORMATION CONCERNING SHREDDER (TREATABLE DIMENSHIONS OR SIZES OR LIKE) FROM ABOVE-MENTIONED INPUTTED INFORMATION CONCERNING FACILITIES OF TREATMENT-ENTRUSTED FACTORY

329 — DECISION AS TO WHETHER REMAINDERS LEFT AFTER SEPARATION OF COMPONENT PARTS TO BE SEGREGATED CAN BE CRUSHED WITHOUT ANY FURTHER TREATMENT
- DETERMINATION OF INFORMATION CONCERNING DIMENSIONS/SIZES OF REMAINDERS LEFT AFTER SEPARATION OF COMPONENT PARTS TO BE SEGREGATED ON THE BASIS OF INFORMATION CONCERNING MANUFACTURED ARTICLE AND COMPARISON WITH ABOVE-MENTIONED INFORMATION CONCERNING CRUSHER SELECTIVELY EXTRACTED, FOR MAKING DECISION AS TO :
  (1) WHETHER OR NOT REMINDERS CAN BE CHARGED IN SHREDDER INTACT, AND
  (2) WHETHRE CUTTING IS REQUIRED AS PRETREATMENT

330 — (2) DETERMINATION OF LOCATIONS FOR CUTTING ON THE BASIS OF INFORMATION CONCERNING MANUFACTURED ARTICLE

331 — OUTPUTTING OF TREATMENT PROCEDURE

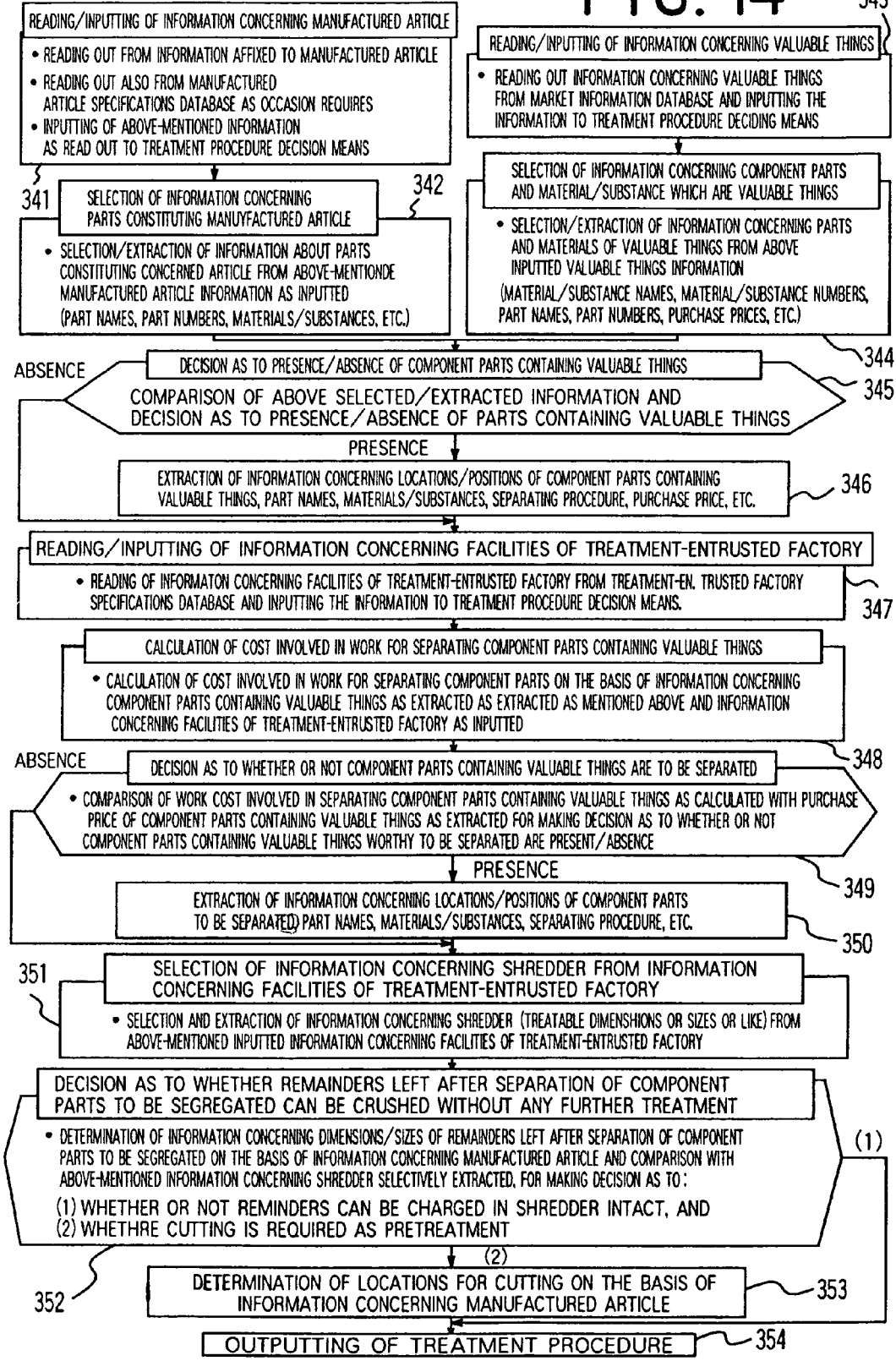

FIG. 18
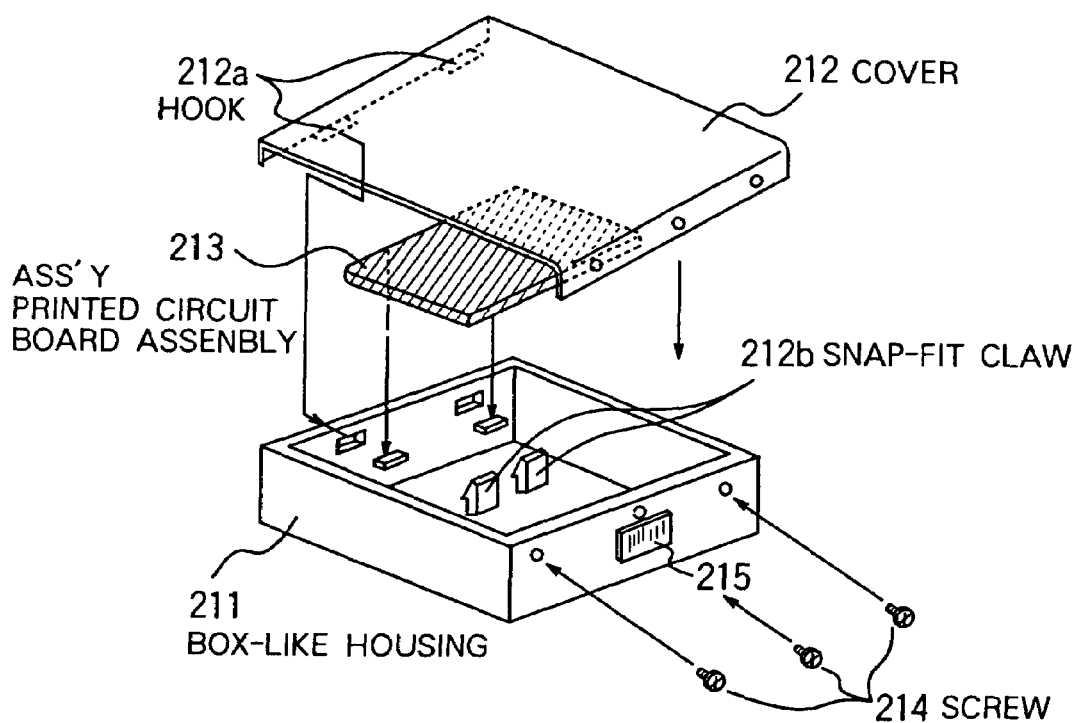
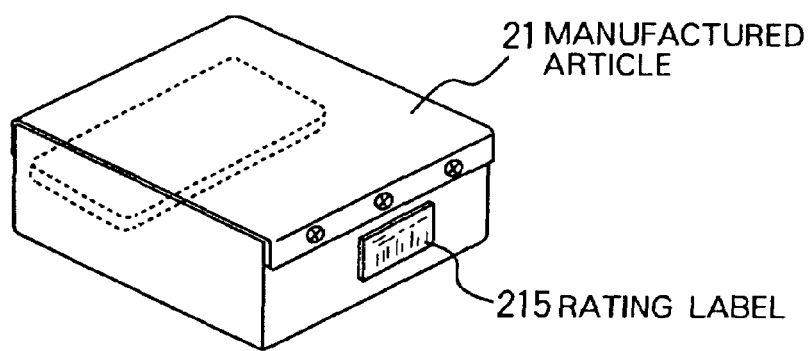

FIG. 19

EXAMPLE OF DATA OF ARTICLE SPECIFICATION INFORMATION

[ADDRESS HEADER]
ADDRESS HEADER ENTRY

| A | BASIC INFORMATION |
|---|---|
| B | DESIGN INFORMATION (1) COMPONENT PART INFORMATION |
| C | DESIGN INFORMATION (2) SIZE INFORMATION |

A: BASIC INFORMATION

| ARTICLE CATEGORY | MANUFACTURER NAMES | MODEL NAME | MANUFACTURE ID NUMBER | MANUFACTURE DATE | WEIGHT |
|---|---|---|---|---|---|
| PRINTED CIRCUIT BOARD UNIT | HITACHI | A−1 | 90101 | 199002 | 1603g |

B: DESIGN INFORMATION (1) COMPONENT PART INFORMATION

| NO | PART NAME | PART CODES | MATEREIALS/ SUBSTANCES | MATERIAL-PART MANUFACTURER | MATERIAL GRADE | WEIGHT |
|---|---|---|---|---|---|---|
| 1 | BOX-LIKE HOUSING | 32786 | PS | ABC | PS10 | 1000 |
| 2 | COVER | 21937 | Al | CDE | Al100p | 200 |
| 3 | PRINTED CIRCUIT BOARD ASSEMBLY | 45789 | Pb,Cu, | NC | — | 400 |
| 4 | RATING LABEL | 11573 | PAPER | SM | HIGH-QUALITY PAPER | 1 |
| 5 | M3X16 SCREW | 23578 | Fe | TK | Fel | 1 |

C : DESIGN INFORMATION (2) SIZE INFORMATION (STORED AS THREE-DIMENSIONAL CAD DATE)

- ARTICLE SIZE
- PART SIZE
- PART LOCATION SIZE
- WEIGHT
- CUTTING MARGIN POSITION, ETC.

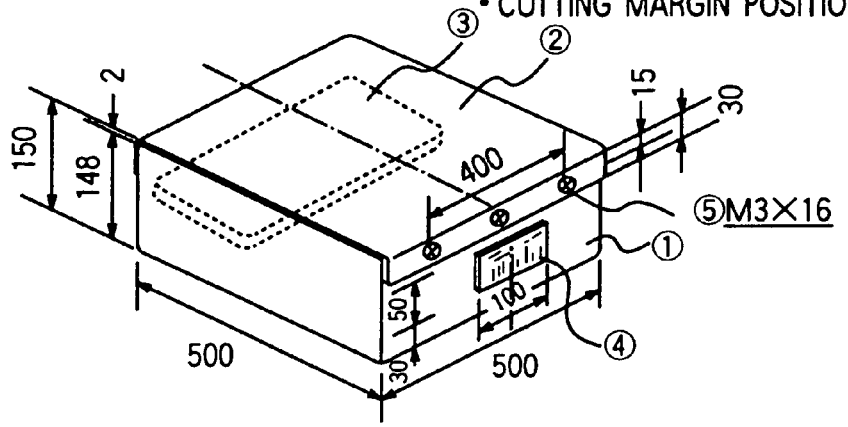

FIG. 20

(CONTINUATION OF C DESIGN INFORMATION (2))

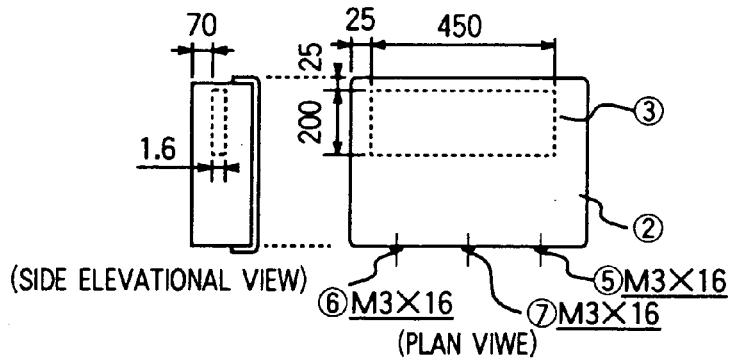

(SIDE ELEVATIONAL VIEW)  (PLAN VIWE)

D : DESIGN INFORMATION (3) PART SEPARATION/DISINTEGRATING PROCEDURE

| NO | PART NAMES | PART CODES | DETACHING DISINTEGRATING PROCEDURE | |
|---|---|---|---|---|
| | | | DISASSEMBLING (WITHOUT DESTROYING ARTICLE) | DISINTEGRATING (ALLOWING DESTRUCTION) |
| 1 | BOX-LIKE HOUSING | 32786 | SCREWS NOS.5,6,7 (⊕CROSS-HEAD SCREW-DRIVER)/COVER↑/PRINTED CIRCUIT BOARD ASSEMBLY↑S | — |
| 2 | COVER | 21937 | SCREWS NOS.5,6,7 (⊕CROSS-HEAD SCREW-DRIVER)/COVER↑ | — |
| 3 | PRINTED CIRCUIT BOARD ASSEMBLY | 45789 | SCREWS NOS.5,6,7 (⊕CROSS-HEAD SCREW-DRIVER)/COVER↑/PRINTED CIRCUIT BOARD ASSEMBLY↑S×2 | MANUFACTURED ARTICLE (CUTTER/COVER/PRINTED CIRCUIT BOARD ASSEMBLY) |

(AVAILABILITY OF MORE DETAILED PROCEDURE INFORMATION)

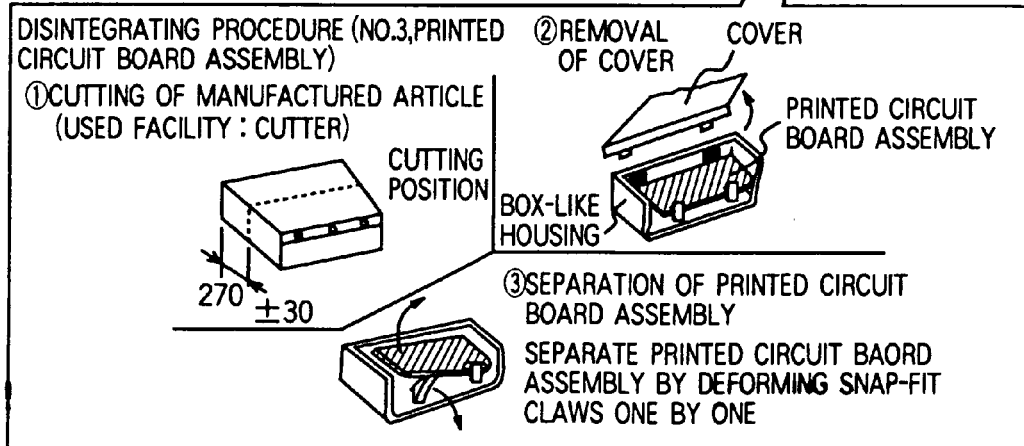

FIG. 22

OUTPUT IMAGE (P1)

PRINTED CIRUIT BOARD UNIT TREATMENT PROCEDURE (NOTE) SINCE THIS MANUFACTURED ARTICLE CONTAINS HARMFUL PARTS (PRINTED CIRCUIT BOARD ASSEMBLY ; PRESENCE OF LEAD), APPROPRIATE TREATMENT IN ACCORDANCE WITH INDICATED PROCEDURES IS REQUIRED

PRINTED CIRCUIT BOARD ASSEMBLY (HATCHED PORTION)

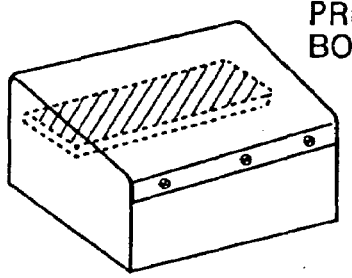

OUTPUT IMAGE (P2)

PRINTED CIRUIT BOARD UNIT TREATMENT PROCEDURE

① CUTTING OF MANUFACTURED ARTICLE

270±30

[USED FACILITY : CUTTER]

CUTTING POSITION

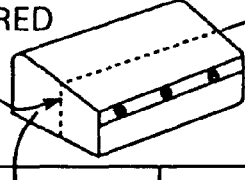

② REMOVAL OF COVER

③ SEPARATION OF PRINTED CIRCUIT BOARD

SEPARATE PRINTED CIRCUIT BOARD ASSEMBLY BY DEFORMING SNAP-FIT CLAWS

④ CRUSHING OF REMAINING PARTS AFTER CUTTING

[USED FACILITY : CUTER : ORDINARY CRUSHER]

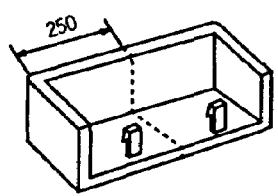
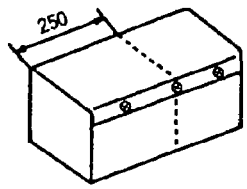
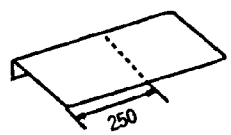

FIG. 27
<PROCEDURE 1>
- SEPARATION OF SCREW
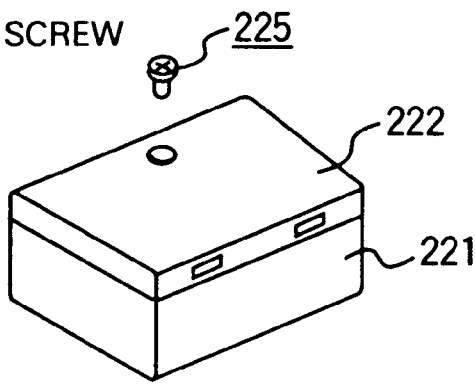
<PROCEDURE 2>
- REMOVAL OF COVER
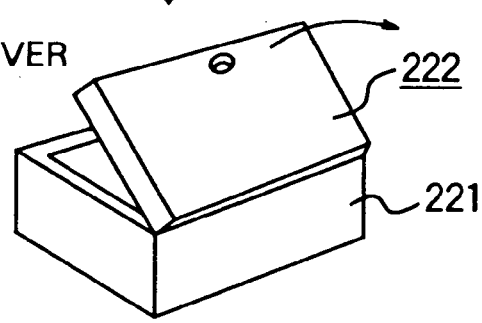
<PROCEDURE 3>
- SEPARATION OF CELL
- SEPARATION OF PRINTED CIRCUIT BOARD
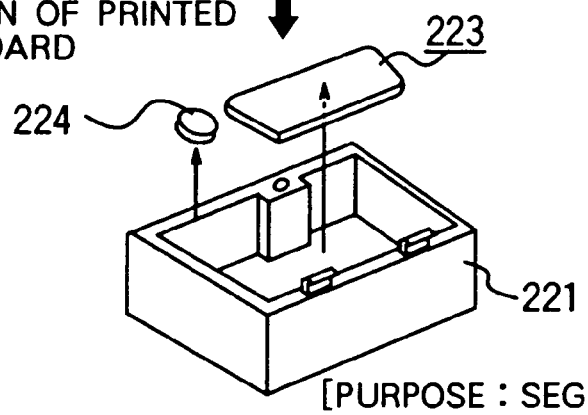
[PURPOSE : SEGREGATION OF HARMFUL PARTS (CELL, PRINTED CIRCUIT BOARD)]
(EXAMPLE OF TREATMENT PROCEDURE INFORMATION GENERATED PREVIOUSLY BY TREATMEMT PROCEDURE DECISION MEANS 4)

FIG. 30

| NO | PART NAMES | PART CODE | SEPARATING PROCEDURE | |
|---|---|---|---|---|
| | | | DISASSEMBLING (WITHOUT DESTROYING MANUFACTURED ARTICLE) | DISINTEGRATION (ALLOWING DESTRUCTION) |
| 1 | BOX-LIKE HOUSING | 32786 | SCREWS NOS.5,6,7 (⊕CROSS-HEAD SCREW-DRIVER)/COVER↑/PRINTED CIRCUIT BOARD ASSEMBLY↑S | — |
| 2 | COVER | 21937 | SCREWS NOS.5,6,7 (⊕CROSS-HEAD SCREW-DRIVER)/COVER↑ | — |
| 3 | PRINTED CIRCUIT BOARD ASSEMBLY | 45789 | SCREWS NOS.5,6,7 (⊕CROSS-HEAD SCREW-DRIVER)/COVER↑/PRINTED CIRCUIT BOARD ASSEMBLY↑S×2 | MANUFACTURED ARTICLE (CUTTER/COVER↑/ PRINTED CIRCUIT BOARD ASSEMBLY↑S) |

| DETACHING PROCEDURE \ FACILITY | SCREW-DRIVER | SHREDDER | CUTTER A | CUTTER B | |
|---|---|---|---|---|---|
| PATTERN A | ○ | | | | |
| PATTERN B | | | ○ | | |
| PATTERN C | | ○ | | | |

FIG. 31

(A FACILITIES INFORMATION)

| 1.SHREDDER | | |
|---|---|---|
| NO | NAMES | TERATMENT-DESTINED OBJECT |
| 1 | ORDINARY SHREDDER | EXLUSIVE OF HARMFUL/HAZARDOUS MATERIAL/SUBSTANCE AND METAL BLOCKS |
| 2 | SHREDDER FOR MEEAL BLOCK | METAL BLOCKS |

| 2.CUTTER | | |
|---|---|---|
| NO | NAMES | TERATMENT-DESTINED OBJECT |
| 1 | CUTTER | EXCLUSIVE OF HARMFUL/HAZARDOUS MATERIAL/SUBSTANCE AND METAL BLOCKS |

FIG. 32

| NO | PART NAMES | PART SIZE | MATERIALS/ SUBSTANCES |
|---|---|---|---|
| 1 | BOX-LIKE HOUSING | 32786 | PS |
| 2 | COVER | 21937 | Al |
| 3 | PRINTED CIRCUIT BOARD ASSEMBLY | 45789 | Pb,Cu |
| 4 | RATING LABEL | 11573 | PAPER |
| 5 | M3×16SCREW | 23578 | Fe |
|  |  |  |  |

- ARTICLE SIZE
- PART SIZE
- PART LOCATION SIZE
- WEIGHT
- POSITION OF CUTTER, ETC.

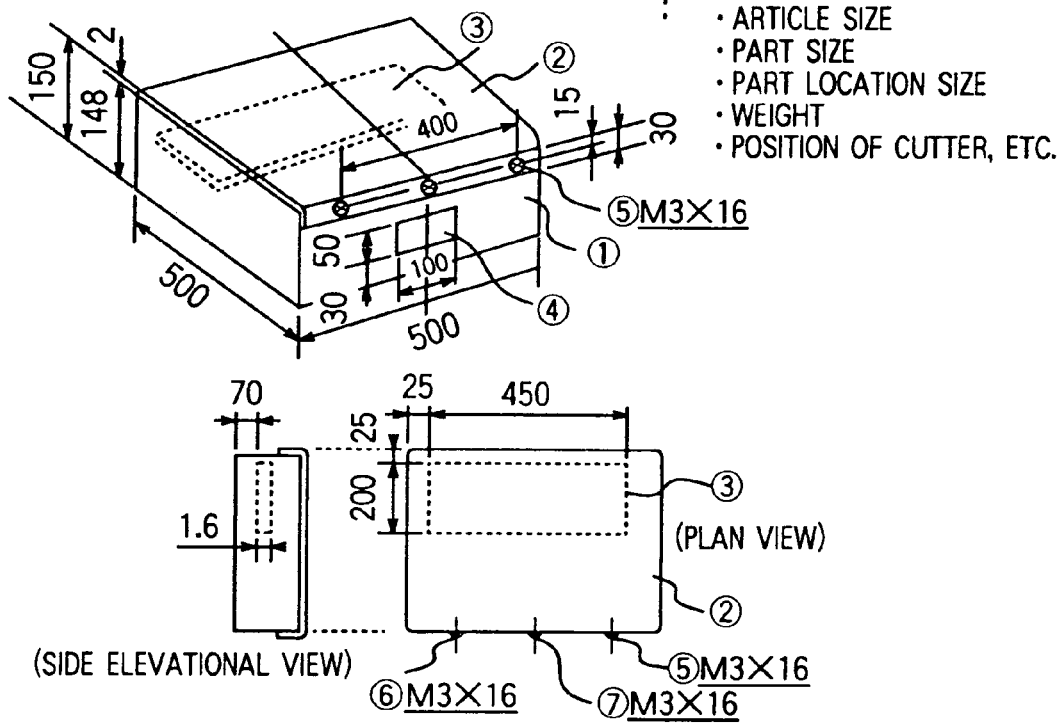

| | | | DETACHING PROCEDURE | |
|---|---|---|---|---|
| NO | PART NAMES | PART CODES | DISASSEMBLING (WITHOUT DESTROYING MANUFACTURED ARTICLE) | DISINTGRATION (ALLOWING DESTRUCTION) |
| 1 | BOX-LIKE HOUSING | 32786 | SCREWS NOS.5,6,7 (⊕CROSS-HEAD SCREW-DRIVER)/COVER↑/PRINTED CIRCUIT BOARD ASSEMBLY↑S | — |
| 2 | COVER | 21937 | SCREWS NOS.5,6,7 (⊕CROSS-HEAD SCREW-DRIVER)/COVER↑ | — |
| 3 | PRINTED CIRCUIT BOARD ASSEMBLY | 45789 | SCREWS NOS.5,6,7 (⊕CROSS-HEAD SCREW-DRIVER)/COVER↑ PRINTED CIRCUIT BOARD ASSEMBLY↑S×2 | MANUFACTURED ARTICLE (CUTTER/COVER↑/ PRINTED CIRCUIT BOARD ASSEMBLY↑S) |

FIG. 33

| 1.SHREDDER | | | |
|---|---|---|---|
| NO | NAMES | TERATMENT-DESTINED OBJECT | TREATABLE PART SIZE |
| 1 | ORDINARY SHREDDER | EXLUSIVE OF HARMFUL/ HAZARDOUS MATERIAL/ SUBSTANCE AND METAL BLOCKS | 300×300×300 (mm) |
| 2 | SHREDDER FOR MEEAL BLOCK | METAL BLOCKS | 300×300×300 (mm) |
| 2.CUTTER | | | |
| NO | NAMES | TERATMENT-DESTINED OBJECT | TREATABLE PART SIZE |
| 1 | CUTTER | EXLUSIVE OF HARMFUL/ HAZARDOUS MATERIAL/ SUBSTANCE AND METAL BLOCKS | 1000×1000×1000 (mm) |

FIG. 35

| 1.SHREDDER | |
|---|---|
| NO | NAMES |
| 1 | ORDINARY SHREDDER |
| 2 | SHREDDER FOR METAL BLOCK |

| 2.CUTTER | |
|---|---|
| NO | NAMES |
| 1 | CUTTER |

FIG. 36

|  | SCREW-DRIVER | CUTTER | SHREDDER |
|---|---|---|---|
| SEPARATING PROCEDURE 1 | O |  | O |
| SEPARATING PROCEDURE 2 |  | O | O |

# MANUFACTURED ARTICLE TREATMENT PROCESSING SYSTEM

CROSS REFERENCE TO RELATED APPLICATION

This is a continuation of U.S. application Ser. No. 09/091,192, filed Jun. 10, 1998, now U.S. Pat. No. 6,226,617, the subject matter of which is incorporated by reference herein.

TECHNICAL FIELD

The present invention relates to a discarded article treatment system for carrying out treatments or disposal of waste manufactured articles.

BACKGROUND ART

Heretofore, discarded articles such as discarded electric appliances for home use are collected and treated by dealers entrusted by a local government and junk dealers engaged in garbage or waste disposal or treatment business. In such discarded articles, some parts of metals such as iron, aluminum and the like are segregated and sorted to be recycled as restored materials/substances. However, in the present state of situation, most of the discarded articles are disposed of for the reclamation or landfill after fragmentation or cremation without undergoing any treatment or processing. As a consequence, there have been arisen serious environmental problems. By way of example, in conjunction with the landfill, there may be mentioned a problem of shortage of land or lot required therefor and problems of soil contamination and water pollution. Similarly, cremation of the discarded or waste articles encounters serious problems such as air pollution, global warming due to generation of $CO_2$ and the like. Such being the circumstances, there exists a great social demand for the efforts for promoting the recycling of the discarded manufactured articles (reuse of the discarded articles as resources) in order to reduce the amount of wastes or make the most of the fossil fuel which is naturally limited while preventing contamination due to discard of harmful wastage.

In the waste disposal facilities, more particularly in the factories for disassembling and segregating the discarded articles, it is required to carry out proper treatments, i.e., detachment or segregation of all the harmful and hazardous materials/substances and parts from the collected discarded articles as well as sorting thereof and transfer the resultants to proper treatment processes or to junk dealers as well as segregation/sorting of materials and parts incapable of treatments with the treating equipment or facilities installed in the relevant treatment-entrusted factory which is in charge or capable of treatment of discarded articles, valuable things to be segregated before shredding and the others (e.g. those destined for shredding treatment by shredders, those susceptible to sorting and recovery of materials resulting from the separation or segregation) and then transport the resultants to the proper treatment processes and the junk dealers correspondingly.

In practice, however, because of less availability of the information required for segregation/sorting, attempts for proper and appropriate treatments of the discarded articles actually encounter difficulty in determining what kinds of component parts and/or materials or substances the discarded articles are composed or made of, locating harmful parts and valuable things and other, as a result of which there are ultimately incurred frequently improper treatments of the discarded articles.

In the present states of the art, the information concerning the methods for carrying out the proper and appropriate treatments of the discarded articles is essentially difficult to acquire. By way of example, almost all of the manufactured articles contain little indication or information concerning the disassembling method, materials or substances of the component parts or the like. On the other hand, the manufacturers are not in the position to afford such information. Further, acquisition of such information takes an awful lot of time.

For the reasons mentioned above, many or most of the discarded articles are disposed of as wastage without undergoing any proper and appropriate treatments.

With the present invention, it is contemplated as an object thereof to reduce the amount of wastage to thereby prevent contamination due to harmful wastes and make the most of the fossil fuel which is naturally limited Another object of the present invention is to protect contamination due to harmful wastes by treating or disposing of discarded articles or things properly and appropriately.

DISCLOSURE OF THE INVENTION

For achieving the above-mentioned objects, the present invention proposes that information required for treatment such as separating procedure of a manufactured article or the like is affixed to the article so that proper and appropriate treatment can be executed on the basis of the information affixed to the manufactured article in a treatment-entrusted factory.

In concrete, there are provided:

a means for reading out from a manufactured article being subjected to treatment a plurality of treatment procedures and information concerning facilities required for executing the above-mentioned treatment procedures, a storage means for storing the information concerning facilities which a treatment-entrusted factory in charge of treatment of the above-mentioned manufactured article is equipped with, and an executing means for extracting the stored information of the facilities which the treatment-entrusted factory is equipped with and facilities information required for executing the treatment procedure to thereby select a treatment procedure capable of being carried out by the facilities which the treatment-entrusted factory is equipped with, wherein the manufactured article is treated in accordance with the selected treatment procedure mentioned above.

Further, there are provided:

a step of reading out from a manufactured article being subjected to treatment a plurality of treatment procedures and information concerning facilities required for executing the above-mentioned treatment procedures, a step of selecting a treatment procedure capable of being carried out by facilities installed in a treatment-entrusted factory from the information concerning the facilities of the treatment-entrusted factory which is in charge of treatment of the manufactured article and the information concerning the facilities required for executing the above-mentioned treatment procedure, and a step of treating the manufactured article in accordance with the selected treatment procedure mentioned above.

In this manner, not only the treatment procedures suited for the facilities of the individual factories can be carried out but also the proper and appropriate treatment of the discarded articles can be realized, whereby the environment pollution due to the disposal of the harmful waste can be prevented.

Further, the above-mentioned storage means stores additionally operating costs of the abovementioned facilities, respectively, while the abovementioned executing means arithmetically determines overall operating costs involved in carrying out the above-mentioned selected treatment procedures, respectively, to thereby select a treatment procedure which is lowest with regards to the calculated overall operating cost determined arithmetically, whereby the treatment of the discarded article can be realized with low cost and high efficiency.

By way of example, the above-mentioned operating cost is stored as operating cost per unit time, wherein for calculation of the above-mentioned overall operating cost, the executing means estimates a time taken for treatment of the article being subjected to the treatment on the basis of dimension or alternatively weight of the article to be treated by the above-mentioned facility and multiplies the estimated time by the operating cost per unit time, whereby the overall operating cost can be calculated.

Furthermore, according to another mode for carrying out the present invention, there are provided:

a means for reading out from a manufactured article being subjected to treatment component parts of the article and specific properties of the above-mentioned component parts, a means for storing predetermined specific properties serving as information for detachment, an executing means for extracting the component parts to be separated on the basis of the predetermined specific properties as stored and specific properties of the component parts of concern, to thereby determine different treatment procedures for the treatment of the component parts to be separated and for the treatment of the other component parts, respectively, a first treating means for treating the component parts to be separated, and a second treating means for treating the other component parts.

Alternatively, there are provided:

a step of reading out from a manufactured article being subjected to treatment component parts of the article and specific properties of the component parts, a step of extracting the component parts to be separated on the basis of predetermined specific properties serving as information for detachment and specific properties of the component parts, and a step of treating the component parts to be separated and the other component parts through different processes, respectively.

In this manner, the proper and appropriate treatments conforming to the specific properties of the component parts such as, for example, materials/substances, harmful materials/substances, hazardous materials/substances and valuable things, respectively, can be realized, whereby the environment pollution due to the disposal of the harmful waste can be prevented.

Furthermore, according to yet another mode for carrying out the present invention, there are provided:

a means for reading out from a manufactured article being subjected to treatment component parts of the article and specific properties of the component parts, a means for storing predetermined specific properties indicating valuable things, a means for extracting component parts constituting valuable things on the basis of the stored predetermined specific properties and the specific properties of the component parts, a means for arithmetically determining cost involved in executing separation procedure for taking out the component parts constituting the above-mentioned valuable things, a means for comparing the arithmetically determined separation procedure cost mentioned above with price of the valuable things, and a means for taking out the above-mentioned valuable things when the price of the valuable things exceeds the cost involved in the above-mentioned separation procedure.

Alternatively, there are provided:

a step of reading out from a manufactured article being subjected to treatment component parts of the article and specific properties of the component parts, a step of extracting component parts constituting valuable things on the basis of predetermined specific properties indicating the valuable things and specific properties of the component parts, a step of arithmetically determining cost involved in executing separation procedure for taking out the above-mentioned component parts constituting the valuable things, a step of comparing the arithmetically determined separation procedure cost mentioned above with price of the valuable things, and a step of taking out the valuable things when the price of the valuable things exceeds the cost involved in the separation procedure.

In this manner, the valuable things are taken out when profits are expected. Thus, meaningless extraction of the valuable things is not performed, whereby the treatment efficiency of the system as a whole can be enhanced.

Furthermore, according to a further mode for carrying out the present invention, there are provided:

a means for reading out from a manufactured article being subjected to treatment a plurality of treatment procedures and purposes of the treatment procedures, a first treating means for treating the manufactured article on the basis of a given one treatment procedure selected from the plurality of treatment procedures mentioned above, a means for monitoring situation in which the manufactured article is being treated, a means for extracting treatment procedures serving for a same purpose as the above-mentioned selected treatment procedure in case it is decided that the above-mentioned treating situation suffers abnormality, and a second treating means for treating the manufactured article on the basis of any one of the extracted treatment procedures mentioned above.

Alternatively, there are provided:

a step of reading out from a manufactured article being subjected to treatment a plurality of treatment procedures and purposes of the treatment procedures, a step of selecting a given one from the plurality of treatment procedures mentioned above, a step of treating the manufactured article on the basis of the selected treatment procedure, a step of monitoring situation in which the manufactured article is being treated, a step of extracting treatment procedures serving for a same purpose as the above-mentioned selected treatment procedure in case it is decided that the above-mentioned treating situation suffers abnormality, and a step of treating the manufactured article on the basis of any one of the above-mentioned extracted treatment procedures.

Thus, not only the alteration of the treatment can be realized in accordance with the situation in which the manufactured article is being treated but also the proper and appropriate treatments suited for the manufactured articles can be carried out.

BRIEF DESCRIPTION OF THE DRAWINGS

FIG. 1 is a view showing schematically and generally a configuration of a manufactured article treatment processing system according to the present invention.

FIG. 2 is a chart showing a flow of treatment procedure determining/outputting processings executed in the manufactured article treatment processing system according to the present invention.

FIG. 9 is a view for illustrating examples of data of a manufactured article specifications information database.

FIG. 10 is a view for illustrating examples of data of a market information database.

FIG. 11 is a view for illustrating examples of data of a treatment-entrusted factory specifications information database.

FIG. 12 is a chart showing a flow of treatment procedure determining/outputting processings according to an exemplary embodiment of the present invention and more particularly shows a flow including a procedure for segregating harmful/hazardous material/substance when a treatment-destined article contains harmful/hazardous material/substance.

FIG. 13 is a chart showing a flow of treatment procedure determining/outputting processings according to an exemplary embodiment of the present invention and more particularly shows a flow including a procedure for deciding whether or not a component part of a manufactured article meets the conditions for treatment-destined object of the facilities of a treatment-entrusted factory to separate the component part in case the manufactured article contains the component part which can not meet the above-mentioned conditions.

FIG. 14 is a chart showing a flow of treatment procedure determining/outputting processings according to an exemplary embodiment of the present invention and more particularly shows a flow including a procedure for deciding whether or not component parts of a manufactured article contains valuable things to be separated, to thereby segregate the valuable things when the parts contain valuable things.

FIG. 18 is a view for illustrating an example of a structure of a manufactured article.

FIG. 19 is a view for illustrating examples of data of manufactured article specifications information concerning a manufactured article illustrated in FIG. 18.

FIG. 20 is a view for illustrating examples of data of manufactured article specifications information concerning the manufactured article illustrated in FIG. 18.

FIG. 22 is a view for illustrating an example of output images in the system according to the present invention.

FIG. 27 illustrates treatment procedures for a manufactured article shown in FIG. 26 as decided by a treatment procedure decision means.

FIG. 30 is a view for illustrating an example of data of article specifications information of a manufactured article.

FIG. 31 shows, by way of example, a facility list with which a treatment-entrusted factory is equipped.

FIG. 32 shows an example of data of article specifications information concerning a manufactured article.

FIG. 33 shows, by way of example, a facility list with which a treatment-entrusted factory is equipped.

FIG. 35 shows, by way of example, a facility list with which a treatment-entrusted factory is equipped.

FIG. 36 is shows an example of data of article specifications information concerning a manufactured article.

BEST MODES FOR CARRYING OUT THE INVENTION

Figure 3:
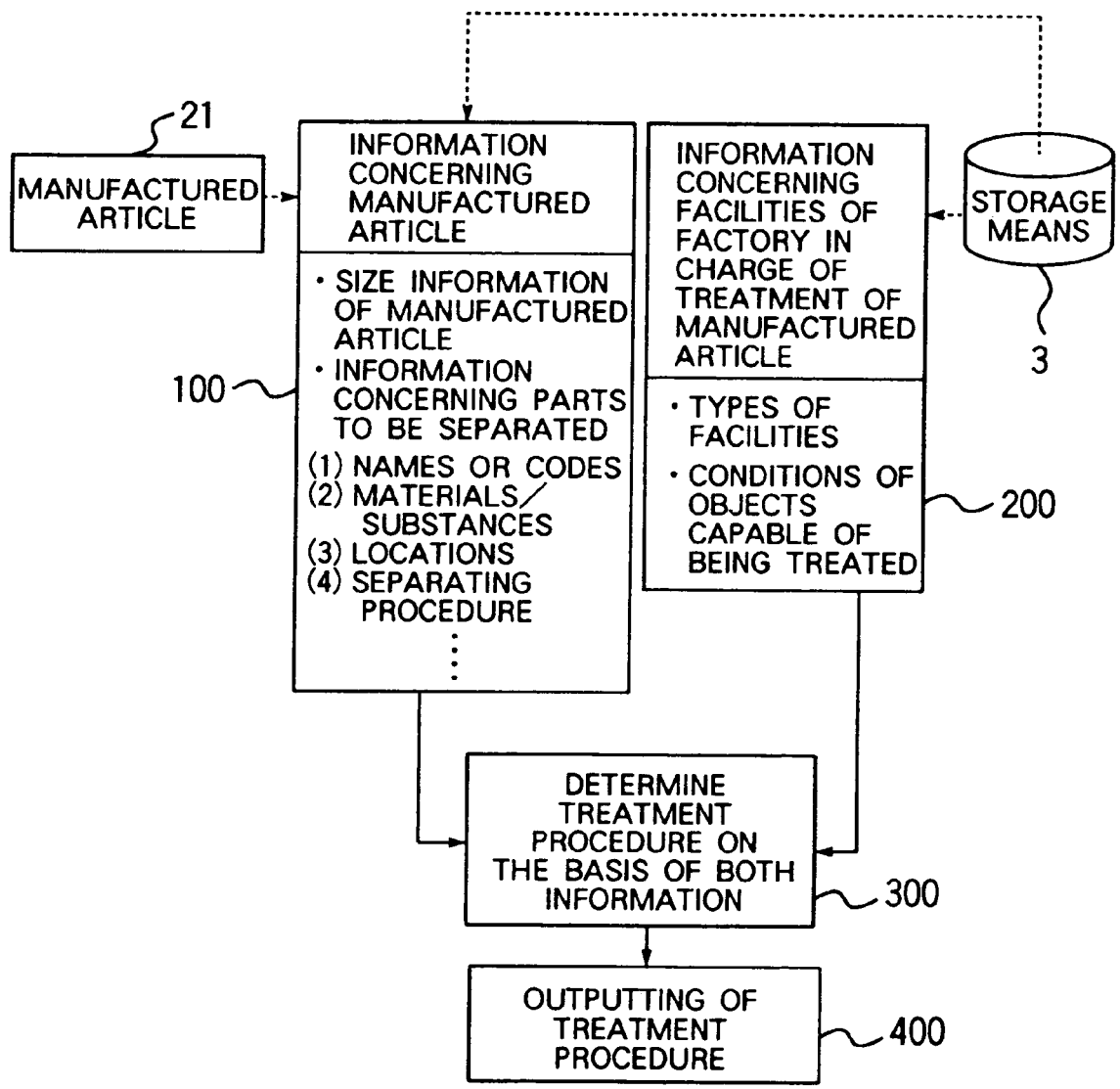
FIG. 3 is a chart showing a flow of treatment procedure determining/outputting processings executed in the manufactured article treatment processing system according to the present invention.

In the following, the present invention will be described by reference to the drawings.

FIG. 1 shows schematically and generally a configuration of a treatment processing system according to the present invention.

As is shown in FIG. 1, the treatment processing system according to the present invention is comprised of a reading means 1 for reading information affixed to a manufactured article being subjected to treatment, a storage means 3 for storing a database of information required for treating the manufactured article, a treatment procedure decision means 4 for deciding a treatment procedure for the manufactured article of concern by referencing the information concerning the treatment of the manufactured article as contained in the database stored in the above-mentioned storage means 3 on the basis of the information affixed to the manufactured article which is read out by the reading means 1, and an output means 5 for outputting the result of the decision made by the above-mentioned treatment procedure decision means 4.

In the treatment processing system, now under consideration by reading out the manufactured article information affixed to the manufactured article by the reading means 1 and by referencing the information concerning the factory facilities as stored in the storage means 3, the treatment procedure to be adopted in a factory or workshop is determined. Referring to FIGS. 2 to 6 and FIGS. 30 to 35, description will be made of the processings executed by the treatment processing system of the configuration described above, which processings include, by way of example, ① determination of the treatment procedure corresponding to the equipment or facilities of a factory or workshop, ② determination of the treatment procedure in consideration of the capability of the factory facilities, ③ determination of the treatment procedure in the case where a manufactured article of concern contains a part or parts to be segregated or separated, ④ determination of the treatment procedure on the basis of cost involved in the treatment, and ⑤ determination of a treatment procedure in the case where valuable things are contained in the manufactured article.

FIG. 2 is a view showing schematically in a flow chart the processings for determining the treatment procedure corresponding or pertinent to the factory facility and outputting the determined procedure in the treatment processing system according to the present invention.

At first, the article information affixed to a manufactured article 21 being subjected to the treatment is acquired (step 100).

As the article information, there are required at least the information concerning the separation procedures for taking out component parts from the manufactured article and the information concerning the facility or equipment demanded for the execution of the separation procedure, as illustrated in FIG. 30. Needless to say, the information concerning the separation procedure as well as the facilities information required for executing the separation procedures are stored, being associated with each other.

Describing briefly the separation procedure illustrated in FIG. 30, there are shown a procedure for taking out a box-like member by separation screws Nos. 5, 6 and 7 with the aid of a screw-driver having a crosshead and a procedure for removing a cover and a printed circuit board assembly by moving them upwardly.

On the other hand, the information concerning the equipment or facilities of the treatment-entrusted factory is made available from the storage means 3 (step 200).

As the information concerning the facilities of the treatment-entrusted factory, there is required at least a facility list enumerating facilities which the treatment-entrusted factory is equipped with, as illustrated in FIG. 31. In the case of the instant exemplary embodiment, it is assumed that the information concerning the facilities and the information concerning the objects for the treatment are stored, being associated with each other. However, it is not always necessary to store the objects for the treatment.

Subsequently, the procedure for treating the manufactured article in the treatment-entrusted factory is determined on the basis of the information acquired in the above-mentioned steps 100 and 200 (step 300).

More specifically, the facilities or equipment required for carrying out the treatment procedure is compared with the facility list provided for the factory to thereby select the facilities which are required for the treatment procedure and which the factory is equipped with.

Next, the treatment procedure for the manufactured article in the above-mentioned treatment-entrusted factory as determined in the above-mentioned step 300 is outputted (step 400).

In this manner, the treatment procedures corresponding to the treatment facilities of the individual factories are selectively outputted. Thus, each of the individual factories can carry out the treatment of the manufactured article which is suited to each factory. To say in another way, according to the teachings of the present invention, proper and appropriate treatment procedures corresponding or pertinent to the factory facilities can be designated for all the manufactured articles, whereby improper treatment for any manufactured article can be excluded, which in turn means that the efficiency of the treatment can be enhanced.

Parenthetically, there are illustrated in FIG. 30 two different separation procedures. However, it goes without saying that the invention can equally find application to the case where more than two different separation procedures exist.

Further, by storing the objects for the treatment and the treatment capacity in association with the facilities information for thereby allowing the object for the treatment and the treatment capacity to be determined in addition to the presence or absence of the facilities, there can be established availably the treatment procedure which is suited for each of the individual factories and which can ensure high reliability for the treatment procedure.

Next, a flow of the treatments in the treatment processing system according to the present invention will be described by taking into consideration the capability of the factory facility (in respect to the sizes susceptible to the treatment) by reference to FIG. 3.

At first, the article information affixed to the manufactured article 21 being subjected to the treatment is acquired (step 100).

As the article information, there may be demanded in addition to the information shown in FIG. 30 the information concerning the dimensions or sizes of the manufactured article and the component parts, the materials or substances of the component parts and the installed positions or locations of the component parts, as is illustrated in FIG. 32. In the case of the example illustrated in FIG. 32, it is assumed that a three-dimensional CAD drawing or the like is made use of for acquiring the information concerning the locations of the component parts. However, the present invention is never restricted to such measures. Parenthetically, by using the three-dimensional CAD drawing, the information concerning the dimensions of the manufactured article and the component parts and the locations or the installed positions of the component parts can be easily made available from the design drawing.

On the other hand, the information concerning the equipment or facilities of the treatment-entrusted factory is acquired from the storage means 3 (step 200).

As the information concerning the facilities of the treatment-entrusted factory, i.e., the factory in charge of the treatment, there may be mentioned, by way of example, information as to what kind of treatments the facilities are designed for (i.e. kinds of the facilities) and treatment-destined object condition information indicating the conditions of the objects which enable the facilities to carry out the treatments, as is illustrated in FIG. 33. Parenthetically, in the case of the examples shown in FIG. 33, there are stored the information concerning the objects capable of undergoing the treatments and the dimensions which permit the treatments. However, the present invention is never restricted to such information. What is required is the information indicating the capabilities of the facilities or equipment.

Subsequently, the procedure for treating the manufactured article to be carried out in the treatment-entrusted factory is determined on the basis of the information acquired in the above-mentioned steps 100 and 200, respectively, (step 300).

More specifically, the materials/substances of the component parts are compared with the objects capable of being treated by the facilities installed in the treatment-entrusted factory to thereby selectively determine the treatment procedures inclusive of the facilities destined for treating the relevant component parts.

By taking into account the materials/substances of the component parts and the objects destined for the treatments by the facilities installed in the factory, the treatment procedures which can be actually carried out by the facilities in the factory can be selectively determined, whereby the proper and appropriate treatments pertinent to the factory can be realized.

In general, in the treatment processing system, almost all of the segregated component parts undergo shredding treatment except for some parts. Accordingly, it is preferred to compare the sizes of the separated component parts with the sizes which enable the separated parts to be charged into a shredder installed in the factory of concern, to thereby decide (1) whether or not the separated component parts can be charged intact into the shredder, or (2) whether or not cutting of the component parts is required as a pretreatment.

When it is decided that the cutting of the component parts is necessary, a command is issued for indicating that the component parts of concern are to be cut into the sizes suited for being charged into the shredder. In this conjunction, the component parts may be cut selectively into halves, one-thirds or so which is suited for charging into the shredder.

Next, the treatment procedure for the manufactured article in the above-mentioned treatment-entrusted factory as determined in the above-mentioned step 300 is outputted (step 400).

In this manner, the treatment procedures pertinent to the treatment facilities of the individual factories, especially capacities of the facilities, are s electively outputted. Thus, each of the individual factories can carry out the treatment of the manufactured article which is suited to each factory. To say in another way, according to the teachings of the present invention, proper and appropriate treatment procedures which are pertinent to the factory or workshop facilities can be designated for all the manufactured articles, whereby improper processing for any manufactured article can be excluded. This in turn means that the efficiency of the treatment can be enhanced.

Figure 4:
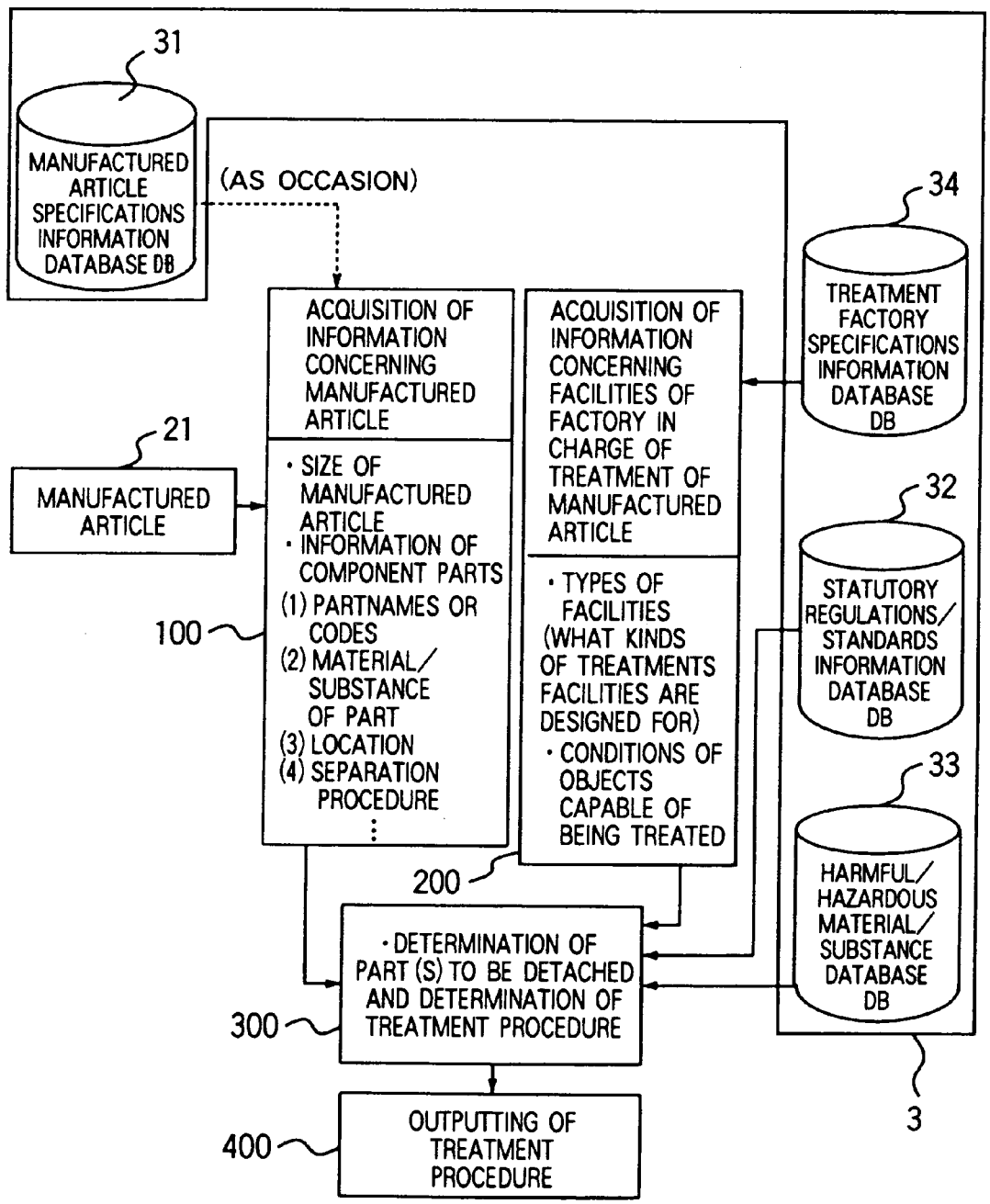
FIG. 4 is a chart showing a flow of treatment procedure determining/outputting processings executed in the manufactured article treatment processing system according to the present invention.

Next, a flow of the treatment in the case where the manufactured article of concern contains component parts to be separated will be described by reference to FIG. 4.

At first, the manufactured article information affixed to the manufactured article 21 being subjected to the treatment is acquired (step 100).

As the article information, there is stored the information concerning the dimensions or sizes of the manufactured article and the component parts, materials or substances of the component parts and the locations of the component parts, as is illustrated in FIG. 32. It is assumed that a three-dimensional CAD drawing or the like is made use of for obtaining the information concerning the locations of the component parts. However, the present invention is never restricted to such measures. Of course, by making use of the three-dimensional CAD drawing, the information concerning the dimensions of the manufactured article and the component parts as well as the locations of the component parts can be easily made available from the design drawing.

On the other hand, the information concerning the statutory regulations and standards and/or the information concerning hazardous and harmful materials or substances are acquired from the storage means 3 (step 200).

Figure 34:
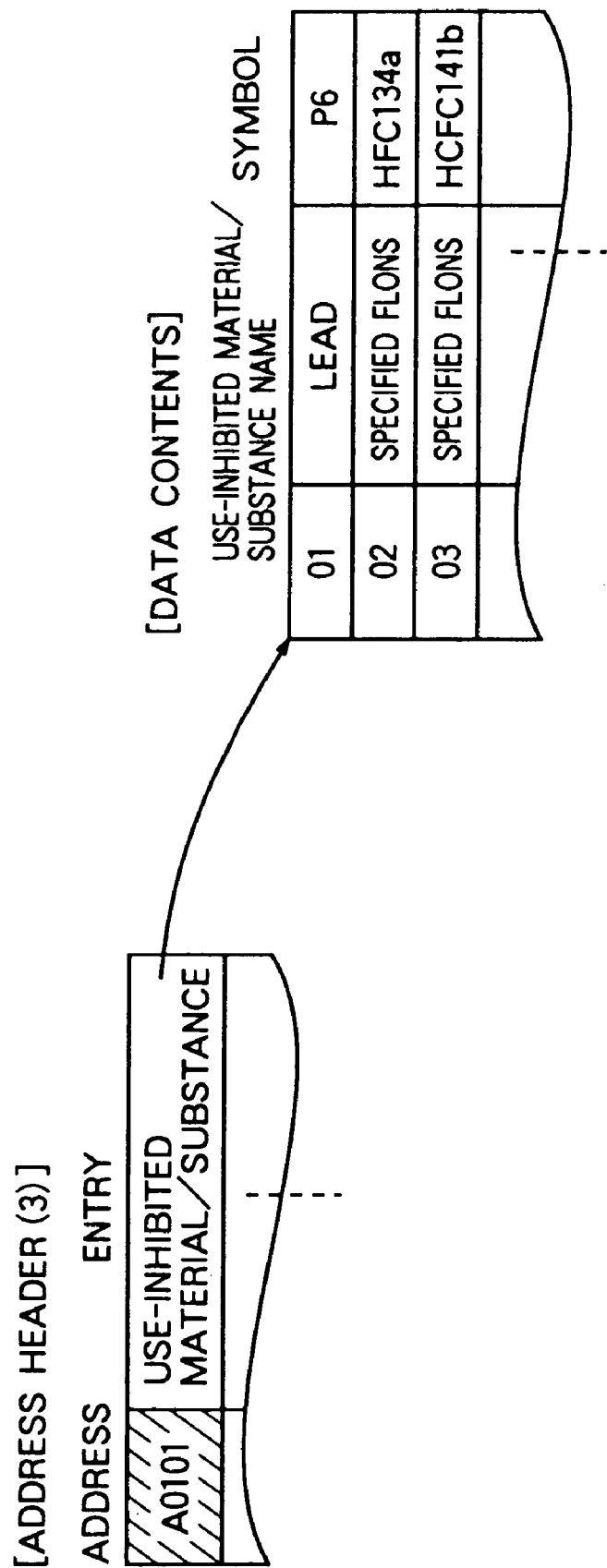
FIG. 34 shows examples of use-inhibited materials/substances.

As examples of the information concerning the statutory regulations and standards and/or the information concerning the harmful/hazardous material/substance, there may be stored lead, specified flons and/or the like as the use-inhibited materials/substances as shown in FIG. 34. In the case of the instant exemplary embodiment of the invention, the information concerning the statutory regulations and standards is stored in a statutory regulations/standards information database 32 with the information concerning the harmful/hazardous materials/substances being stored in a harmful/hazardous material/substance database 33.

Further, in the processing/treatment system now under consideration, the information concerning the statutory regulations and the hazardous materials/substances is managed, which can be realized simply by managing entries representing the information concerning the segregation or detachment of the component parts from the manufactured article without incurring any problem.

Subsequently, the procedure for treating the manufactured article in the treatment-entrusted factory is determined on the basis of the information acquired in the above-mentioned steps 100 and 200, respectively (step 300).

More specifically, decision is made as to whether the component parts of the manufactured article concerned contain the materials or substances same as or equivalent to those stored as the use-inhibited materials or substances. When this decision results in affirmation, the information concerning the locations or the installed-positions of the harmful part/hazardous materials to be separated is extracted from the information concerning the manufactured article read out as mentioned previously.

In succession, the output means 5 outputs the result determined in the above-mentioned step 300 (step 400).

More specifically, presence/absence of the use-inhibited materials/substances as well as the locations thereof, if present, are outputted. As the output means to this end, it is preferred to adopt the three-dimensional CAD. In accordance with the output information, the component parts made of the use-inhibited materials/substances can be distinctively or separately treated in the treatment-entrusted factory. By way of example, the parts formed of use-inhibited materials/substances may be stored with the other component parts being crushed or shredded.

Further, a database storing the information concerning various detachments or segregations may be provided, and the contents of the database may be updated as occasion requires. Thus, the harmful/hazardous materials/substances contained in the manufactured articles can be treated in accordance with the up-to-date information, whereby environmental disruption due to unconscious discarding of harmful materials can be prevented. In other words, by using the database mentioned above, a manufactured article containing materials/substances which were not statutorily deemed to be harmful can be treated in view of the statutory regulations effective at the time of current treatment of the manufactured article which may be considered as containing harmful material in the light of the currently effective statutory regulations.

Further, when the component parts to be separated or segregated can be discriminatively grasped on a material-by-material basis (on the basis of the specific properties of the manufactured articles), the manufactured article can be treated separately for the individual materials (on a specific property basis). By way of example, component parts of a manufactured article may be crushed and recovered on a material-by-material basis.

Parenthetically, proper information may be previously imparted to the manufactured article itself without resorting to the use of the statutory regulations or the like information database.

Figure 5:
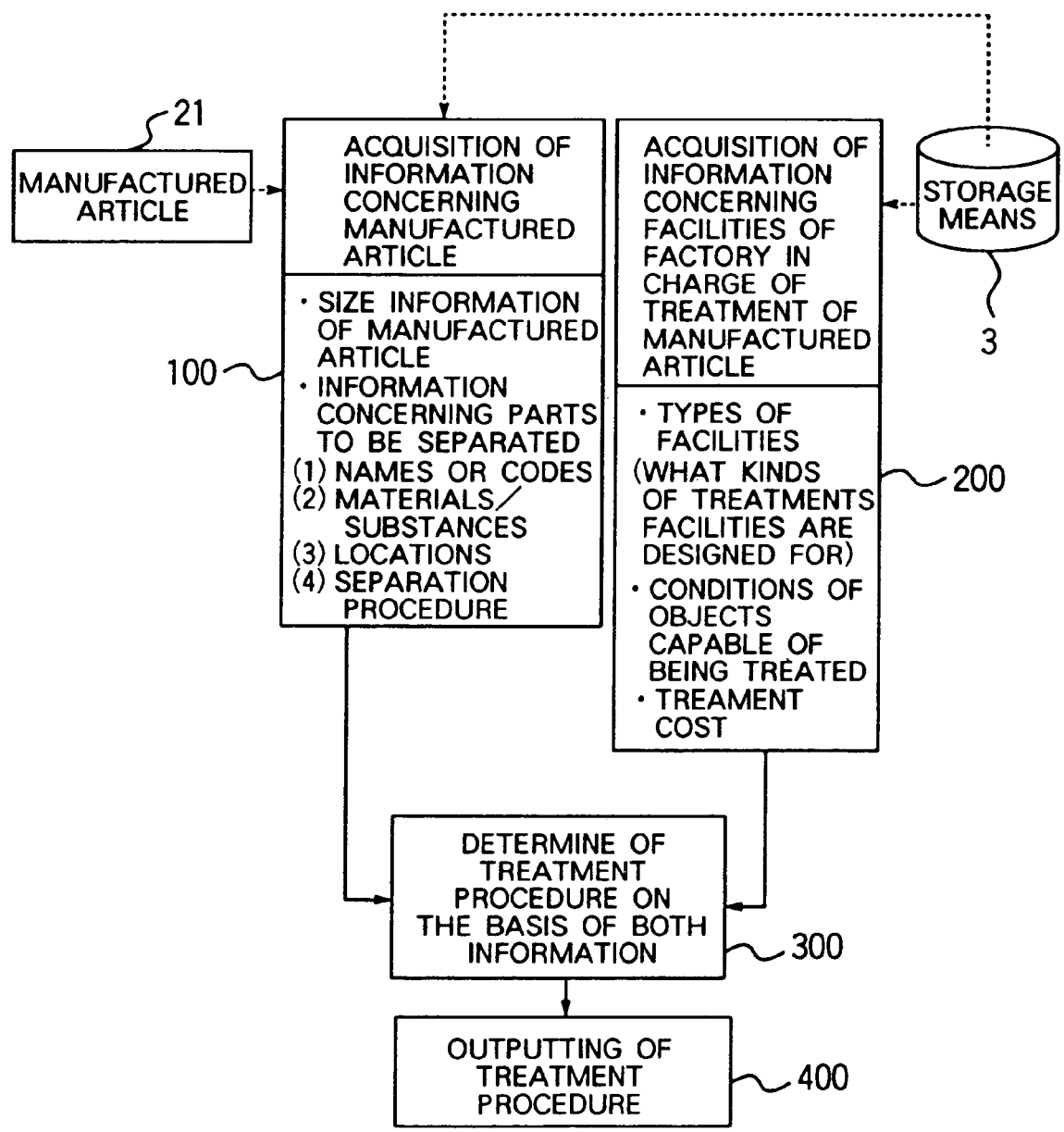
FIG. 5 is a chart showing a flow of treatment procedure determining/outputting processings executed in the manufactured article treatment processing system according to the present invention.

Next, description will be directed to the case where a plurality of treatment procedures can be selected and where a given one of the treatment procedures is to be selected on the basis of cost involved in the facilities by referring to examples shown in FIG. 5.

At first, the article information affixed to the manufactured article 21 to be subjected to the treatment is acquired (step 100).

As the article information, there are required at least the information concerning the separation procedures for taking out component parts from the manufactured article and the information concerning the facility or equipment demanded for the execution of the separation procedure, as illustrated in FIG. 30. Needless to say, the information concerning the separation procedure and the information concerning the facilities required for executing the separation procedures are stored, being associated with each other.

On the other hand, the information concerning the equipment or facilities of the treatment-entrusted factory is fetched from the storage means 3 (step 200).

As the information concerning the facilities of the treatment-entrusted factory, there is required at least a facility list enumerating facilities which the treatment-entrusted factory is equipped with and the costs involved in the treatments, as illustrated in FIG. 35. In the case of the instant exemplary embodiment, it is assumed that the information concerning the objects for the treatment and the information concerning sizes of the parts capable of committing to the treatment are stored, being associated with each other. However, it is not always necessary to store them.

Subsequently, the procedure for treating the manufactured article in the treatment-entrusted factory is determined on the basis of the information acquired in the above-mentioned steps 100 and 200 (step 300).

More specifically, the facilities or equipment required for carrying out the treatment procedure is compared with the facilities which the factory is equipped with and which are listed, to thereby select the facilities which are required for the treatment procedure and which the factory is equipped with.

For the treatment procedure as selected, the cost involved in carrying out the treatment in accordance with the procedure as selected is arithmetically determined. To this end, there are conceivable a variety of calculation methods. By way of example, the cost may be arithmetically determined on the basis of the data shown in FIG. 35. In the case of the instant exemplary embodiment, it is presumed that the treatment cost per minute is stored. Accordingly, the service times of the facilities on an average is previously determined on the basis of the size of the manufactured article to be treated and stored. For determining the treatment cost, the service time of each facility is multiplied with the treatment cost per unit time, whereon a total sum is determined by adding together the costs involved in the individual treatment processes, respectively.

Consequently, when a plurality of treatment procedures are extracted, the treatment costs of all treatment procedures are calculated and the procedure involving the lowest one among the costs as calculated is selected.

In succession, the treatment procedure for the manufactured article in the above-mentioned treatment-entrusted factory as determined in the above-mentioned step 300 is outputted (step 400).

In this manner, the most inexpensive treatment procedures corresponding to the treatment facilities of the individual factories are selectively outputted. Thus, each of the individual factories can carry out effectively the treatments for the manufactured article. To say in another way, according to the teachings of the present invention, proper and most inexpensive treatment procedures pertinent to the facility or facilities of the factory can be designated for all of the manufactured articles, whereby the efficiency of the treatment can be enhanced.

Figure 6:
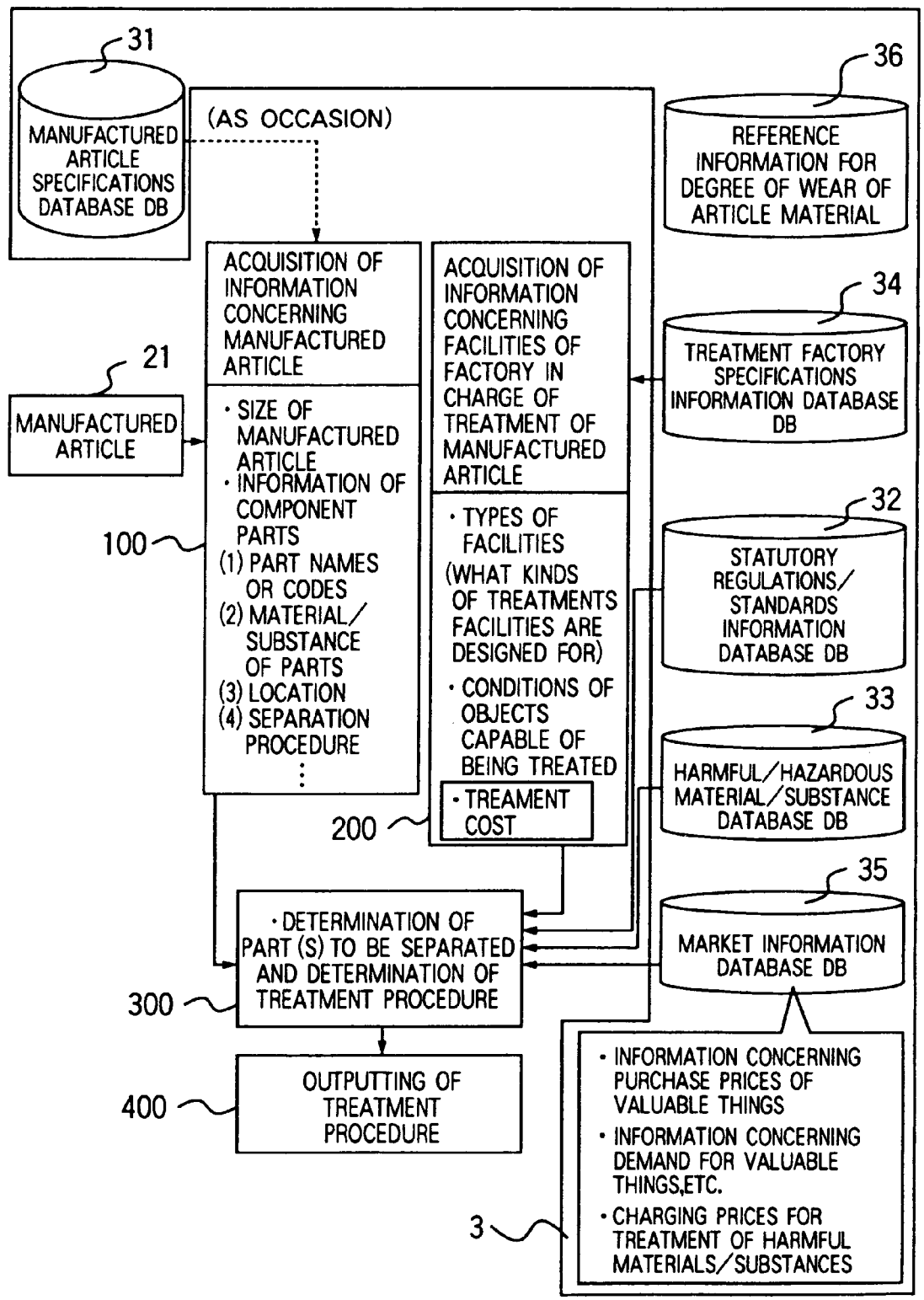
FIG. 6 is a chart showing a flow of treatment procedure determining/outputting processings executed in the manufactured article treatment processing system according to the present invention.

Next, description will turn to an exemplary case where valuable things are contained in the manufactured article and where decision is to be made whether or not the valuable things are to be removed on the basis of the market prices of the valuable things or the like by reference to FIG. 6.

At first, the article information affixed to the manufactured article 21 to be subjected to the treatment is acquired (step 100).

As the article information, there are required at least the information concerning the separation procedures for taking out component parts from the manufactured article and the information concerning the facilities or equipment demanded for the execution of the separation procedure, as illustrated in FIG. 30. Needless to say, the information concerning the separation procedure and the information concerning the facilities required for executing the separation procedures are associated with each other for storage thereof.

On the other hand, the information concerning the equipment or facilities of the treatment-entrusted factory is acquired from the storage means 3 (step 200).

As the information concerning the facilities of the treatment-entrusted factory, there is required at least the information concerning the facilities which the treatment-entrusted factory is equipped with and the costs involved in the treatment, as illustrated in FIG. 35. In the case of the instant exemplary embodiment, it is assumed that the information concerning the objects for the treatment and the information concerning the sizes of the manufactured article capable of committing to the treatment are stored, being associated with each other. However, this is not always necessary. In the case of the instant exemplary embodiment of the invention, the information concerning the facilities of the treatment-entrusted treatment-entrusted factory is stored in a treatment-entrusted factory specifications information database 34.

Subsequently, the procedure for treating the manufactured article in the treatment-entrusted factory is determined on the basis of the information acquired in the above-mentioned steps 100 and 200 (step 300).

Namely, the processings described below are executed.

At first, information concerning the valuable things is read out from a market information database 35 to be inputted to the treatment procedure decision means 4. In this conjunction, the market information database 35 may store the purchase prices of the component parts, materials and the like on the market. Further, there may be stored in the market information database 35 in addition to the information concerning the purchase prices of the valuable things, the information concerning the demand for the valuable things, and the information concerning charging prices for the treatment of the harmful/hazardous materials/substances.

Subsequently, the information concerning the parts and the materials stored as the valuable things (e.g. material/substance names, material/substance numbers, part names, part numbers, purchase prices and the like) is selectively extracted from the abovementioned information concerning the valuable things as inputted.

In succession, the information concerning the component parts of the manufactured article is compared with the information concerning the parts and the materials of the above-mentioned valuable things selectively extracted, to thereby make decision as to whether or not there exist any component parts which are the valuable things.

If the above decision results in affirmation, the market prices of the valuable things are arithmetically determined on the basis of the information stored in the market information database 35.

On the other hand, the most inexpensive treatment procedure (i.e., the treatment procedure which does not lead to destruction of the parts determined as the valuable things) which can be realized with the facility of the factory is selected, as described hereinbefore in conjunction with the processing flow shown in FIG. 5. For selecting the treatment procedure involving no destruction of the valuable parts, such scheme, for example, may be adopted in which the treatment procedure of concern is selected from those in which the shredder is not used.

Next, the cost involved in the works for separation or segregating the parts inclusive of the valuable things as calculated as mentioned above is compared with the purchase price information of the parts including valuable things as extracted as mentioned above, to thereby make decision whether or not the treatment-entrusted factory can gain profits.

When profits are expected, the treatment procedure is executed by the treatment processing system. On the other hand, unless profits can be expected, the most inexpensive treatment procedure is again selected from those which can be realized by employing the facilities which the factory is equipped with, and the treatment is executed in accordance with the selected treatment procedure.

By executing the treatment procedure while taking into consideration the reuse of the valuable things in this way, there can be provided less expensive treatment procedure, whereby effective treatment can be realized.

Next, referring to FIGS. 7 to 22, and FIG. 36, description will be directed to a more concrete example of the treatment processing system implemented operatively by a combination of the exemplary embodiments described hereinbefore.

Figure 7:
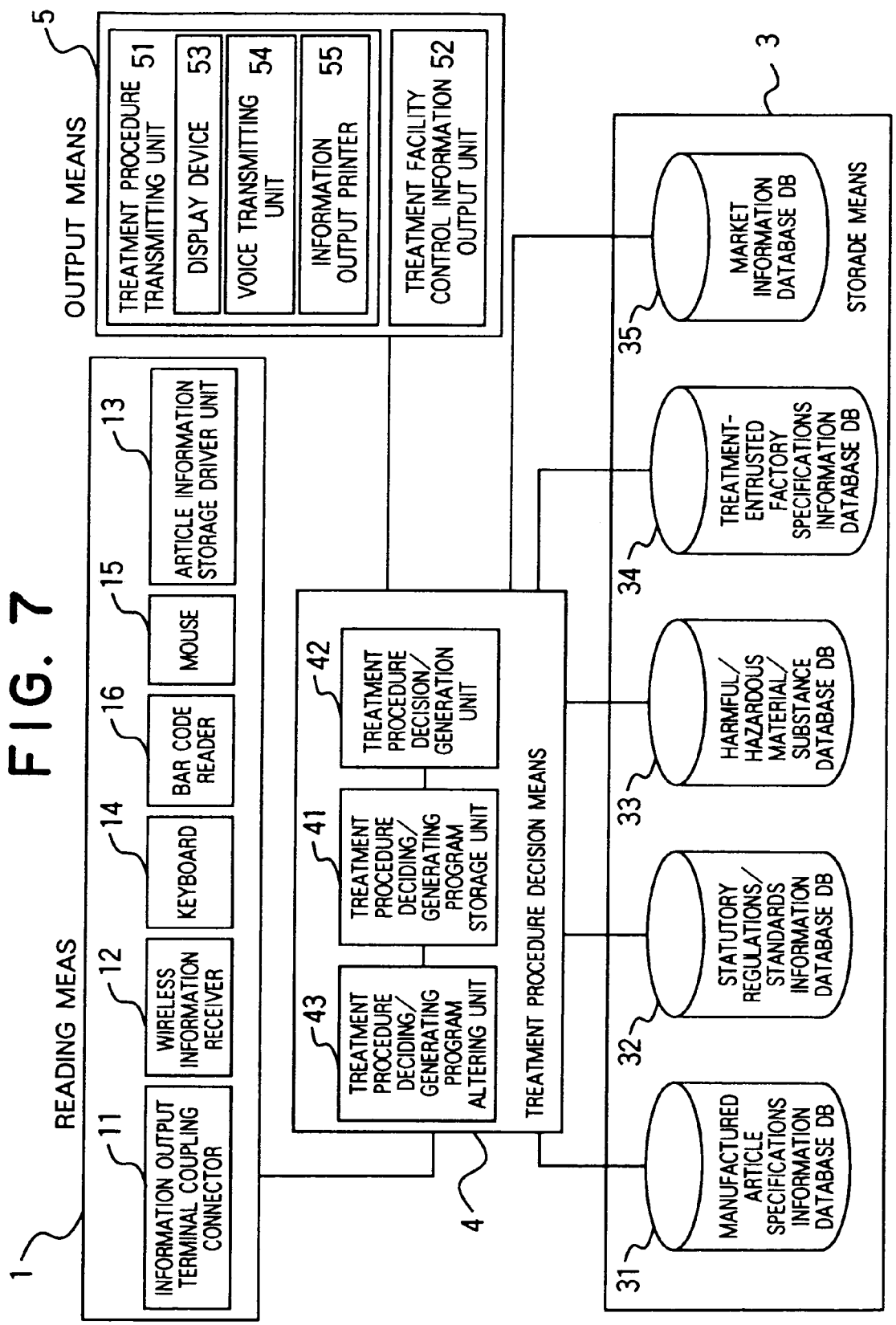
FIG. 7 is a view showing schematically and generally a configuration of a manufactured article treatment processing system according to the present invention.

The treatment processing system shown in FIG. 7 is mainly comprised of a reading means 1 for reading information affixed to a manufactured article 21 subjected to the treatment, a storage means 3 for storing a database of information required for treating the manufactured articles, a treatment procedure decision means 4 for deciding a treatment procedure for the manufactured article of concern by referencing the information affixed to the manufactured article and read out by the reading means 1 and the information concerning the treatment of the manufactured article contained in the database stored in the above-mentioned storage means 3, and an output means 5 for outputting the results of the decision made concerning the discarded articles by the above-mentioned decision means 4.

The reading means 1 may be provided with at least one of an information output terminal coupling connector 11, a radio information receiver unit 12, an article information storage drive unit 13, a keyboard 14 or a mouse 15 and a bar code reader 16 although it depends on the structure of the manufactured article of concern.

Figure 15:
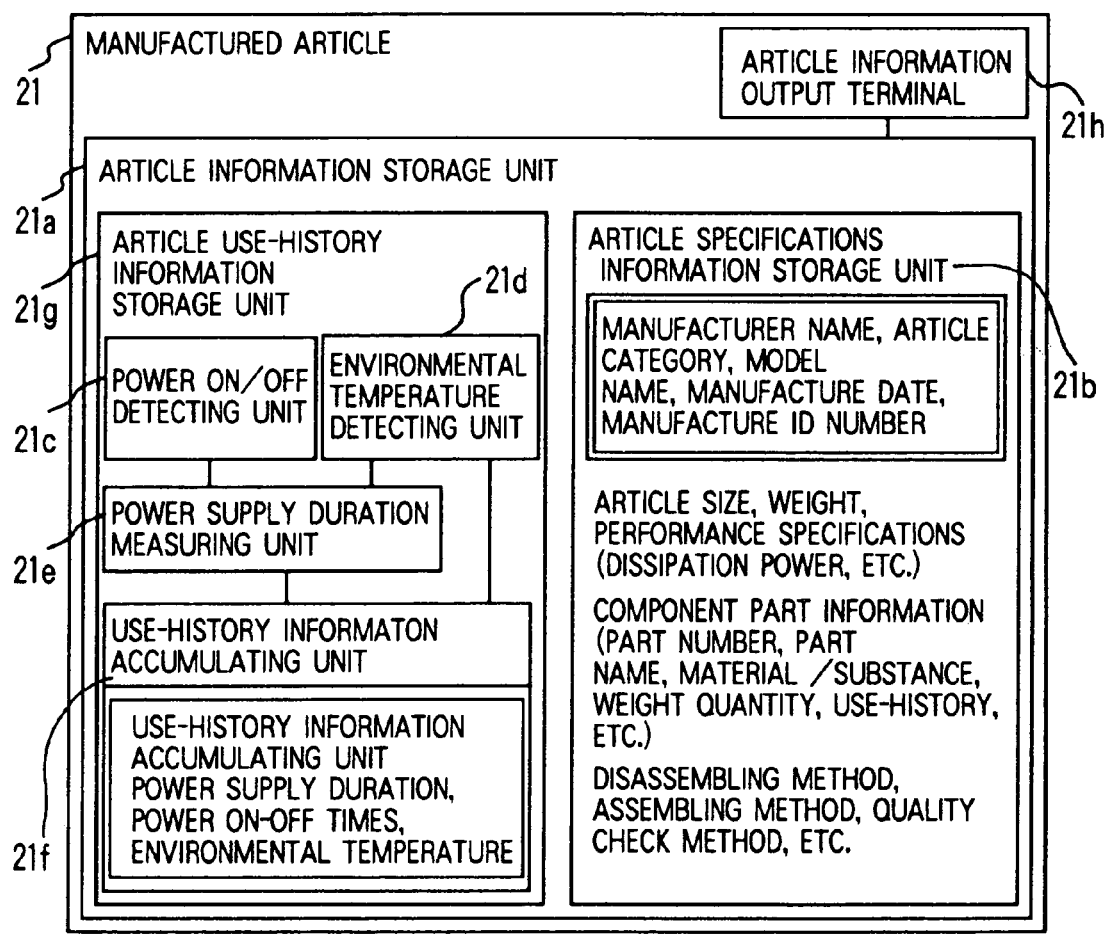
FIG. 15 is a view for illustrating an example of a structure of a manufactured article.
Figure 16:
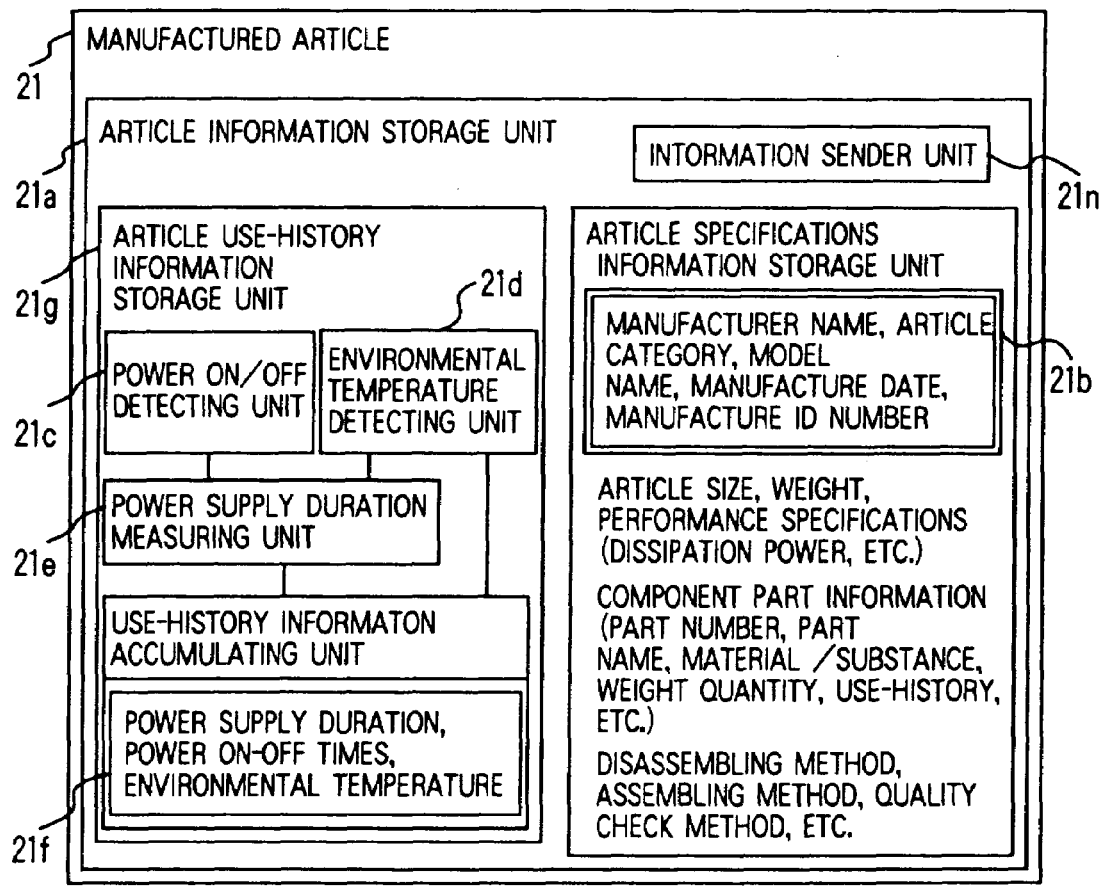
FIG. 16 is a view for illustrating an example of a structure of a manufactured article.
Figure 17:
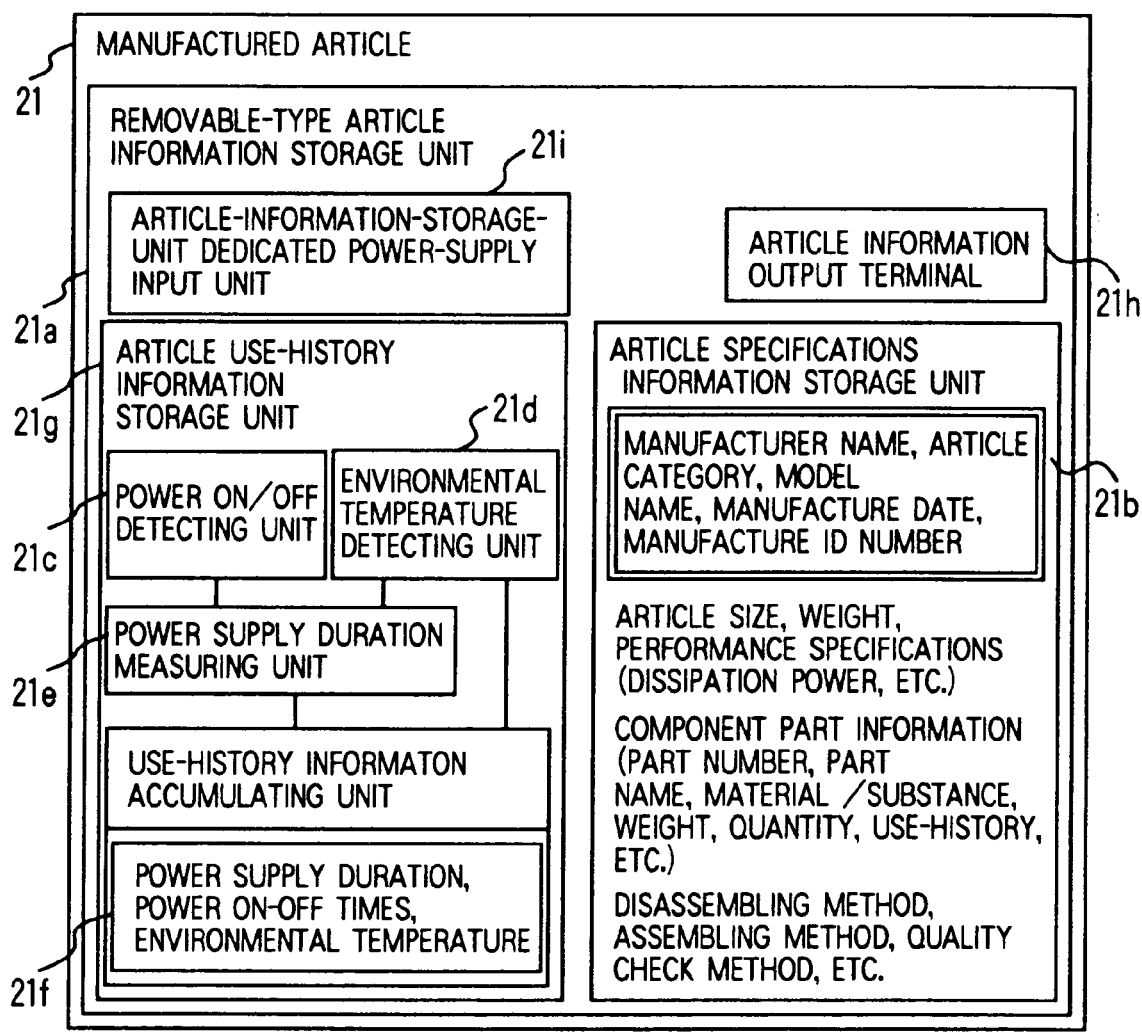
FIG. 17 is a view for illustrating an example of a structure of a manufactured article.

At this juncture, structures and storage information of manufactured articles will be illustrated, by way of examples, in FIGS. 15 to 17.

FIG. 15 shows an example of the manufactured article having such a structure in which the article information thereof is extracted by way of an article information output terminal 21h which serves as a terminal for external connection.

The manufactured article 21 having the article information includes an article information storage unit 21a for storing the specifications, a use history of the manufactured article and an article information output terminal 21h for outputting the article information.

The article information storage unit 21a is further comprised of an article use-history information storage unit 21g for storing a history of the manufactured article and an article specifications information storage unit 21b storing the specifications of the manufactured article.

The article use-history information storage unit 21g is provided with a power on/off detecting unit 21c for detecting power-on/off of a power supply incorporated in the manufactured article, a power supply duration measuring unit 21e for measuring a power supply duration of the manufactured article in accordance with a signal issued from the power supply on/off detecting unit 21c and a use-history information accumulating unit 21f for storing the result of measurement outputted from the power supply duration measuring unit 21e. Parenthetically, the use-history information accumulating unit 21f may be so implemented as to store the number of times the power supply is turned on/off.

Further, the article use-history information storage unit 21g may be equipped with an environmental temperature detecting unit 21d for measuring environmental or ambient temperature at which the manufactured article is used, to thereby store the results of the detection in the use-history information storing unit 21d.

By managing the use-history information of the manufactured article such as, for example, the power supply duration, the environmental temperature, etc. in this way, treatment procedures can be determined in the treatment processing system according to the present invention described later on.

Furthermore, the article specifications information storage unit 21b stores unique identification information such as manufacturer name, category of the manufactured article, etc., article specifications information such as article size, weight, component parts, etc. and treatment information such as disassembling method, assembling method or the like.

FIGS. 16 and 17 show other examples of the manufactured article.

In the case of the manufactured article shown in FIG. 16, an information signal sender unit 21n is mounted in place of the article information output terminal 21h. With regards to the other respects, the article shown in FIG. 16 is similar to the one shown in FIG. 15.

With the structure of the manufactured article now under consideration, reading of the information concerning the manufactured article can be realized wirelessly.

Similarly, in the case of the manufactured article shown in FIG. 17, the article information storage unit 21 is implemented as a removable unit, which of course involves no problems in practical applications.

As is apparent from the above, the specifications information, the use history information, the treatment information and the like can be managed internally of the manufactured article precedingly, so that these information can be read out by the treatment processing system according to the present invention.

Accordingly, the reading means 1 will have to be equipped with the facilities or units mentioned below in order to cope with the treatments of the manufactured articles described above.

Firstly, in the case of the manufactured article equipped with the article specifications information storage unit 21b storing the information concerning the manufactured article of concern and the article information output terminal 21h for delivering externally the information of the manufactured article, as in the case of the manufactured article 21 shown in FIG. 15, the reading means has to be provided with an information output terminal coupling connector 11 which is adapted to be connected to the article information output terminal of the manufactured article of concern for reading out the article information.

Further, in the case of the manufactured article internally equipped with the article specifications information storage unit 21b storing the information concerning the manufactured article of concern and the information signal sender unit 21n having the function for outputting wirelessly the information of the manufactured article, as in the case of the manufactured article shown in FIG. 16, the reading means has to be provided with an information receiver unit 12 for receiving wirelessly the article information from the manufactured article.

Further, in the case of the manufactured article equipped with the removable-type article information storage unit 21i, as in the case of the manufactured article shown in FIG. 17, the reading means 1 has to be provided with an article information storage drive unit 13 for driving the separated article information storage unit 21i.

Furthermore, the reading means 1 may be equipped with a keyboard 14 and a mouse 15 for inputting manually the article information labeled on the casing of the manufactured article 21 by reading the information visually.

Alternatively, the reading means may be equipped with a bar code reader 16 for reading out the article information indicated in the form of a bar code on the casing or the like of the discarded article.

Next, description will turn to the database stored in the storage means 3.

As the databases, there may be provided an article specifications information database 31 for storing the specifications information of various manufactured articles, a statutory regulations/standards information database 32 for storing information concerning a variety of statutory regulations and standards, a harmful/hazardous material/substance database 33 for storing the information concerning the harmful/hazardous materials/substances, a treatment-entrusted factory specifications database 34 for storing information regarding the sorts or types of the facilities for treating the Manufactured articles which the factory in charge of carrying out the treatment is equipped with, the treatment-destined object condition information indicating the conditions of the objects capable of undergoing the treatments by the facilities as well as the costs involved in the treatment, and a market information database 35 for storing information concerning the market quotation of the price of the valuable things such as usable manufactured articles, usable parts, materials/substances for reuse, materials for fuel and the information concerning the demand for the valuable things and the like.

Figure 8:
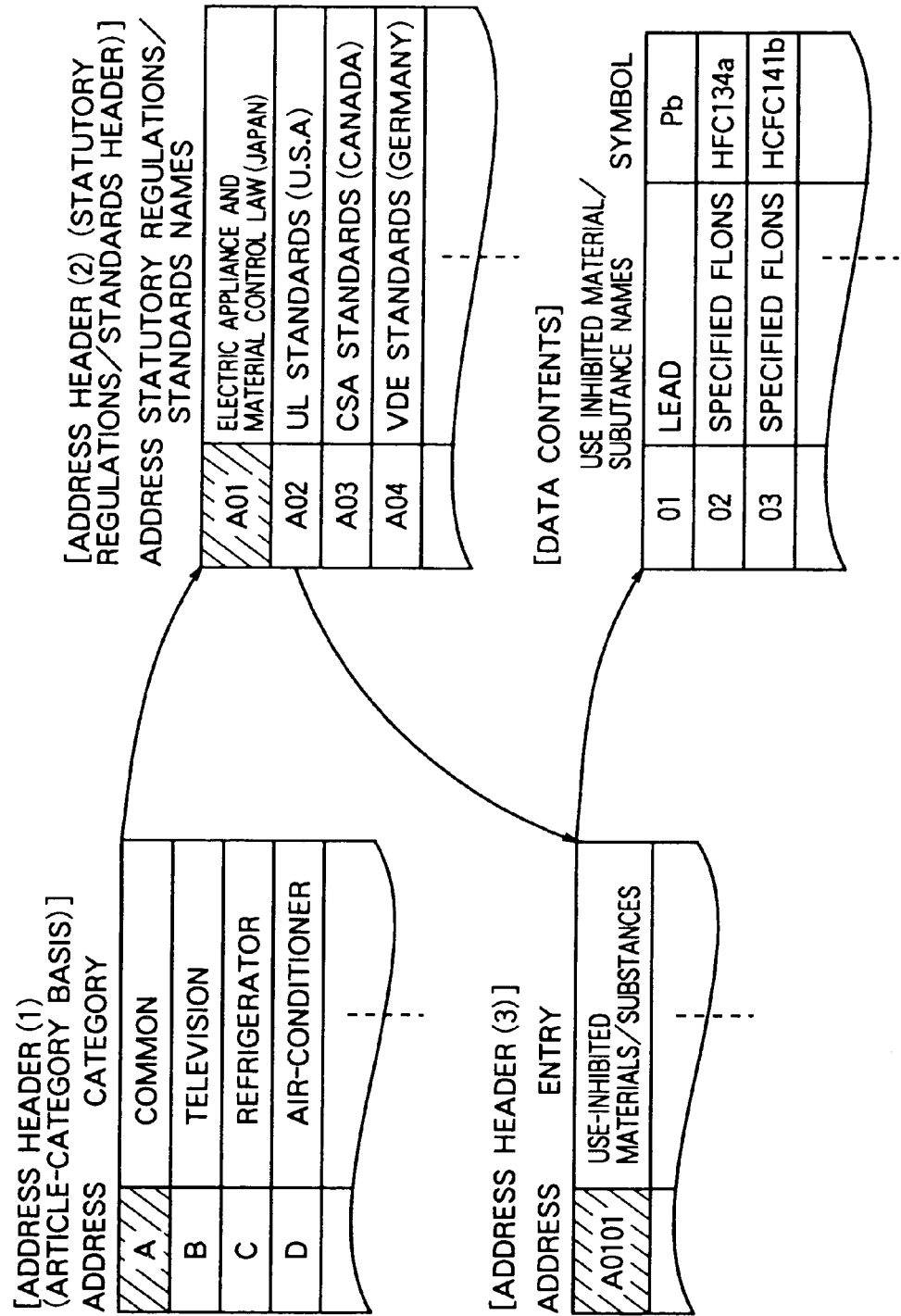
FIG. 8 is a view for illustrating examples of data of a statutory regulations/standards information database.

The statutory regulations/standards information database 32 stores therein the information concerning the statutory regulations and standards in various countries, as can be seen in FIG. 8. The statutory regulation information may be obtained from the official gazettes or the like by individual enterprises, a given corporation or the like and stored in the statutory regulations/standards information database 32 as generated.

Similarly, the information concerning the standards can be obtained from the organization in charge of controlling the standards and stored in the database. In that case, it is preferred to prepare the database by arranging orderly the information on the basis of categories of the manufactured articles.

In the statutory regulations/standards information database 32 shown in FIG. 8, the statutory regulations are stored on an article category basis in an address heading field (1). On the other hand, there are stored in an address heading field (2) the statutory regulations/standards in the individual countries in correspondence to the addresses for the categories of the manufactured articles, respectively. Further, entries such as the use-inhibited materials/substances are stored in an address heading field (3) in correspondence to the statutory regulations/standards in the individual countries, respectively, with the data contents corresponding to the entries, respectively, being also stored.

In the case of the example shown in FIG. 8, the Electric Appliance And Material Control Law is adopted as the statutory regulations common to the categories, wherein lead, specified flons and the like are designated as materials or substances whose use is statutorily inhibited.

On the other hand, in the harmful/hazardous material/substance database 33, there is stored the information concerning the harmful/hazardous materials/substances as well as the treatment methods thereof. The information is also managed as a database implemented in the form of tables on a material/part basis by the enterprise or a given corporation.

In the article specifications information database 31, there is previously stored the information concerning the article specifications, as illustrated in FIG. 9. This information is also stored orderly in the form of a database on the basis of manufacturers, categories of manufactured articles, model names and others, respectively, by the individual enterprises or a corporation entrusted by the enterprises. The article specifications information is affixed to each of manufactured articles upon shipping thereof.

In the article specifications information database 31 shown in FIG. 9, basic information, design information, and the like are stored in the address heading fields. There exist such data which correspond to the addresses of the address heading fields, respectively. The data portion corresponding to the basic information may contain the categories of the manufactured articles indicating the names of the manufactured articles, manufacturer names, model names, manufacturing numbers an d the like. Similarly, the data portion corresponding to the design information contains screen sizes, outer dimensions and the like. Further, as the design information (2), there are stored the information concerning the names of the component parts, materials/substances thereof, material/part manufacturers, grade, weight, number, dimensional information and the intra-article part location information. Additionally, there may be stored such information which concerns disassembling or disintegrating procedures, reuse-destined parts, use history, part exchange dates, etc., respectively, as the component part information. These article specifications information may be stored on a manufactured article basis or stored en bloc for all the manufactured articles as a database.

In the market information database 35, there are stored the information which concerns the market quotation prices of the valuable things such as the used articles, used parts, materials/substances for recycling, fuel-destined materials/substances and the like, the information concerning the demand for the valuable things mentioned above, stock information of the parts for the purpose of maintenance, management and so forth internally of the enterprise or by the corporation entrusted, as shown in FIG. 10.

The market information database 35 shown in FIG. 10 stores therein the market prices of the used articles on an article type basis so that the market price information can be obtained when the restored article such as the restored televisions are to be recycled as the used article. Besides, the information concerning the market prices of the used parts is also stored so that the market prices of the component parts of the manufactured article can be made available when they are to be recycled as the used parts. Similarly, the purchase price information, the demand information and other for the valuable materials/substances for recycling may be stored on a material-by-material basis or additionally on a grade basis (e.g. on the basis of grade, purity and the like indicated by virgin material manufacturer) and/or on an application-by-application basis.

The treatment-entrusted factory specifications information database 34 stores therein as the address leading the information concerning the types of the equipment or facilities installed in the treatment-entrusted factories for treating the manufactured articles, the treatment-destined object condition information indicating the conditions of the objects or articles which allow them to be treated by the facilities and the costs involved in the treatments. Such treatment-entrusted factory specifications information database 34 may be provided on a treatment-entrusted factory basis or for each workshop of a treatment-entrusted factory when latter includes a plurality of workshops or alternatively the treatment-entrusted factory specifications information database 34 may be provided in common to all the treatment-entrusted factories or workshops.

Generations of the individual databases, works for inputting the information to the individual databases as well as works for maintenance/management of the data such as correction or alteration thereof may be performed internally of each of the individual enterprises. As an alternative, such works may be performed by a common organization established by a plurality of manufacturers of the same trade or by an official corporation or the like.

The entries of the address heading fields contain respective data. The information concerning the facilities which the factory is equipped with is stored on a machine-type basis. By way of example, there may be stored such facilities information as shredders, cutters, etc,. Further, for each of categories, the names of the facilities which are actually installed, the treatment-destined objects, the treatment cost per unit time and the like are entered. Parenthetically, the treatment-destined objects represents the specified objects which can be treated by a facility or equipment.

In this way, the facilities which the factory is equipped with and more particularly the capability or capacity of the facility as well as the treatment cost can be grasped.

Similarly, the costs for the various works involved in the treatments are stored as the treatment work cost information.

The databases described so far are used selectively in dependence of the applications for which the treatment processing system according to the invention is employed. Thus, it is not necessarily required to provide all of the databases described above.

The treatment procedure decision means 4 includes the following:

(1) Treatment Procedure Deciding/Generating Program Storage Unit 41

Stored in this storage unit is a treatment procedure deciding/generating program which serves for deciding and generating a treatment procedure for an manufactured article of concern by referencing the information affixed to the manufactured article and read out by the reading means 1 as well as the information concerning the treatment of the manufactured article as contained in the database stored in the above mentioned storage means 3.

(2) Treatment Procedure Decision/Generation Unit 42

This unit serves to decide and generate the treatment procedure for the manufactured article of concern by using the above mentioned treatment procedure decision/generation program stored in the treatment procedure deciding/generating program storage unit 41 on the basis of the information affixed to the manufactured article and read out by the reading means 1 and the information concerning the treatment of the manufactured article as contained in the database stored in the above mentioned storage means 3.

(3) Treatment Procedure Deciding/Generating Program Altering Unit 43

With this unit, it is possible to alter the above-mentioned treatment procedure deciding/generating program.

The output means 5 is connected to the treatment procedure decision means by wire or wirelessly and includes a treatment procedure transmitting unit 51 and a treatment facility control information output unit 52 described below.

(1) Treatment Procedure Transmitting Unit 51

This unit serves for indicating the results of the above mentioned treatment procedure decision to a worker(s) of a treatment-entrusted factory. As the apparatus to this end, there may be mentioned an apparatus for displaying the treatment procedure in terms of image information and/or character information by means of a display device 53 such as television, display monitor or the like and a voice transmitting unit 54 for transmitting the results of the treatment procedure decision by voice by using a loudspeaker and the information output printer 55 for the result of the treatment procedure decision by generating the output in the form of printed matter such a sheet of paper printed with characters, symbols, bar codes or the like.

(2) Treatment Facility Control Information Output Unit 52

This unit serves to transmit the treatment procedure information decided by the above-mentioned treatment procedure decision means to a treatment facility control unit for controlling the facility or facilities installed in the treatment-entrusted factory. Transmission may be realized by wire or wirelessly.

Next, referring to FIG. 7, description will be made of operation of the treatment processing system according to the present invention for determining and outputting the treatment procedures for deciding the component parts which contain hazardous material/substance or harmful material/substance which are to be segregated from the manufactured article, the treatment-destined object.

Description will be made by taking as example the treatment for an manufactured article (circuit board unit) shown in FIG. 18.

Referring to FIG. 18, there is shown a manufactured article 21 composed of a box-like housing 211, a cover 212, a printed circuit board assembly 213, screws 214 and a rating label 215. The box-like housing 211 has snap-fit claws 212*b* mounted thereon for holding the printed circuit board assembly 213, while the cover 212 is equipped with hooks 212*a* adapted to mate with the snap-fit flaws 212*b*, respectively.

The rating label 215 carries the article specifications information in the form of a bar code.

FIGS. 19 and 20 shows examples of the data carried by the manufactured article (name: circuit board unit) shown in FIG. 18.

As the manufactured article specifications information, there are stored basic information/design information concerning the component parts (1), design information concerning dimensions or sizes (2) and design information concerning the disassembling or disintegrating procedure for the manufactured article (3), as shown by the entries in the address headers, respectively.

The basic information includes the information unique to the manufactured article such as the types or species of the manufactured article, manufacturer name, model name and the like.

The design information (1) carries information concerning the materials/substances, weights and the like of the box-like housing, the cover, the printed circuit board assembly and others which are the component parts of the manufactured article 21.

The design information (2) carries the dimensions or sizes of the manufactured article and the component parts, the locations of the component parts and the like in the form of three-dimensional CAD data.

The design information (3) carries the separation procedures for the component parts, wherein the separation procedures cover both the case where the component parts are separated by breaking them and the case where the component parts are separated without being broken.

For removing the box-like housing, such stored procedure is adopted that the screws Nos. 5, 6 and 7 are taken out by means of a screw-driver having a cross-head, whereon the cover and the printed circuit board assembly are separated by moving them upwardly.

Similarly, for separation the printed circuit board assembly without breakage, such stored procedure is adopted that the screws Nos. 5, 6 and 7 are taken out by means of a screw-driver having a cross-head, whereon the cover and the printed circuit board assembly are separated by moving them upwardly. On the other hand, in case the printed circuit board assembly is separated by breaking it, the manufactured article is cut in a predetermined pattern, whereon the cover and the board are removed upwardly.

In the case of the removal which is accompanied with breakage, relevant detailed information is additionally affixed, as shown in FIG. 20. More specifically, the manufactured article cutting positions and the separation procedure in succession to the cutting are stored as the disintegrating information in a predetermined format.

Although two different separation procedures are illustrated, it goes without saying that plural different types of separation procedures may be adopted in conjunction with the detachment accompanied with destruction or breakage of the manufactured article and the detachment without breakage of the manufactured article. Further, it is not necessarily required to make distinction between the disintegrating information with breakage and the disassembling information without breakage.

Subsequently, the facilities required for executing the separation procedures are registered in correspondence to these separation procedures, respectively. Thus, it is possible to select the treatment procedure which can be realized by the existing or available facility which the factory is equipped with, an example of which is shown in FIG. 36.

By way of example, the disassembling procedure 1 shown in FIG. 36 is presumed to be carried out without destroying the manufactured article. This procedure requires a screw-driver for dismantling the box-like housing and others and a shredder for shredding the segregated parts.

Although the information concerning the dimensions of the manufactured article and the component parts as well as the information concerning the locations or positions of the component parts internally of the manufactured article are shown in the form of the three-dimensional CAD data in FIGS. 19 and 20, this is only for the purpose of illustration. These information may be given as the two-dimensional CAD data. Further, as other dimensional information having a high degree of necessity, there may be mentioned location information for the manufactured article which carries the information concerning locations along which the component parts are to be separated (joints between the component parts, to say in another way).

Now referring to a flow chart of FIG. 12, description will be made of the procedure for treating the manufactured article mentioned above with the treatment processing system shown in FIG. 7.

(Step 301: Reading/inputting of the information concerning the manufactured article)

The information concerning the manufactured article 21 which is the object for treatment is read out not only from the rating label 215 affixed to the manufactured article but also from the article specifications information database 31 as occasion requires, whereon the information as read out is inputted to the treatment procedure decision means 4. When the information concerning the manufactured article is stored in the article specifications information database 31, then only the information capable of identifying the manufactured article may be written on the rating label. In that case, the article specifications information database is retrieved on the basis of the information capable of identifying the manufactured article to thereby extract the relevant detailed design information and others. However, the information concerning the manufactured article is never restricted to the above. The information may be contained in the manufactured article itself or stored in an external storage unit such as the manufactured article specifications database.

At this juncture, it should be mentioned that the information concerning the relevant manufactured article 21 as read out contains at least the information concerning the component parts of the manufactured article 21, the information concerning the materials/substances of the component parts and the information concerning the location or positions of the component parts in the manufactured article as well as the information concerning the disassembling procedure. Further, the dimensional information may be added as occasion requires.

In the case of the manufactured article shown in FIG. 18, contents printed on the rating label 215 in the form of a bar code (manufacturer name, article name, model, manufacture No.) is read out by means of the bar code reader 16, whereon the manufactured article specifications information for the article 21 is read out from the manufactured article specifications information database on the basis of the read-out information to be subsequently inputted to the treatment procedure decision means 4.

(Step 302: Selection of the information concerning the component parts constituting the manufactured article)

Next, as a preparation for making decision as to whether the component parts of the manufactured article of concern contain any harmful/hazardous material/substance, the information concerning the component parts constituting the manufactured article concerned (part names, part Nos., materials/substances and the like) is selectively extracted from the abovementioned manufactured article information as inputted.

(Step 303: Reading/inputting of the information concerning the harmful/hazardous materials/substances)

As an additional preparation for making decision as to whether the component parts of the manufactured article concerned contain any harmful/hazardous material/substance, the information concerning the harmful/hazardous materials/substances to be segregated (see FIG. 8) is read out from the statutory regulations/standards information database 32 and the harmful/hazardous material/substance database 33 and inputted to the treatment procedure decision means 4. (Step 304: Selection of the information concerning harmful parts and materials/substances and the information concerning hazardous parts and materials/substances)

In succession, the information concerning the harmful parts and the materials/substances thereof as well as the information concerning the hazardous parts and the materials/substances thereof (part names, part numbers or Nos., materials/substances, etc.) is selectively extracted from the above-mentioned input information concerning the harmful/hazardous materials/substances to be segregated.

(Step 305: Decision as to whether or not harmful parts/hazardous parts to be separated are contained in the manufactured article)

Next, the information concerning the component parts constituting the concerned manufactured article (part names, part Nos., materials/substances, etc.) as extracted selectively in the step 302 is compared with the information concerning the harmful parts to be segregated and the materials/substances thereof as well as the information concerning the hazardous parts and the materials/substances thereof (part names, part numbers or Nos., materials/substances, etc.) as extracted selectively in the step 304, to thereby make decision as to presence/absence of the harmful/hazardous materials/substances to be segregated in the component parts of the manufactured article of concern.

To this end, decision may be made as to whether the materials/substances are same or not or whether the part Nos. are same or not. To this end, identification information for discriminatively indicating whether or not harmful material or hazardous material is contained in the component parts may be affixed to the manufactured article or stored in the database incorporated in the treatment processing system. In this conjunction, however, it is expected that recognition of the harmful/hazardous material/substance may differ between the time points of shipping the manufactured article and the waste treatment thereof. Accordingly, the identification information must be of universal nature unique and corresponding to the characteristics of the component parts, respectively.

When the decision in the step 305 results in the presence, the processing proceeds to a step 306 while proceeding to a step 309, if otherwise.

In the case of the manufactured article 21, the comparison of both the information mentioned above will show that the printed circuit board assembly 213 contains lead (Pb). Accordingly, decision will be made to the effect that the printed circuit board assembly 213 is a component part containing harmful substance. Thus, the step 306 is executed. (Step 306: Extraction of the information concerning the locations/positions of the harmful parts/hazardous parts to be separated, part names, materials/substances, separation procedure, etc.)

The information concerning the locations/positions of the harmful parts/hazardous parts to be separated, the disassembling or separation procedure, etc. is extracted from the read-out information concerning the manufactured article.

In the case of the manufactured article 21 shown in FIG. 18, the information concerning the location at which the printed circuit board assembly 213 is positioned, the separation procedure, etc., is such as illustrated in FIGS. 19 and 20.

(Step 307: Reading/inputting of the information concerning the facilities in the treatment-entrusted factory)

The information concerning the facilities in the treatment-entrusted factory is read out from the treatment-entrusted factory specifications information database 34 to be inputted to the treatment procedure decision means 4.

The information concerning the facilities in the treatment-entrusted factory which is in charge of treatment has been described hereinbefore by reference to FIG. 11. (Step 308: Determination of the separation procedure by taking into account the information concerning the facilities of the treatment-entrusted factory)

The separation procedure information for the component parts to be separated as extracted in the step 306 is compared with the information concerning the facilities of the treatment-entrusted factory as read out in the step 307, to thereby select the treatment procedure which can be executed with the facilities which the treatment-entrusted factory is equipped with.

More specifically, the facilities of the relevant treatment-entrusted factory are compared with those required for the individual treatment procedures shown in FIG. 36, to thereby select the treatment procedure that is treatable by the facilities which the treatment-entrusted factory is equipped with.

As the separation procedure for the printed circuit board assembly 213 of the manufactured article 21 shown in FIG. 18, there are available two different procedures, i.e., the disassembling procedure and the disintegrating procedure. In case both the procedures mentioned above can be executed in the treatment-entrusted factory concerned, there arises necessity for selecting either one of the procedures mentioned above. According to the teachings of the invention incarnated in the instant embodiment, selection of the procedure is made on the basis of the costs involved in carrying out the procedures.

A method of computing the costs involved in the treatment procedures to be carried out in the treatment-entrusted factory will be described below.

The costs required for the individual works contained in the separation procedure which in turn is contained in the manufactured article specifications information are arithmetically determined by referencing a treatment-entrusted factory-based work cost information table shown in FIG. 11, whereon the total sum of the costs involved in the individual work procedures is calculated to thereby select the work procedure of low cost through comparison.

In the case of the example now under consideration, the separation procedure based on the disintegrating procedure is selected.

(Step 309: Reading/inputting of the information concerning the facilities of the treatment-entrusted factory)

Even for the manufactured article for which decision is made that neither harmful parts nor the hazardous parts exist, the information concerning the facilities of the treatment-entrusted factory is read out from the treatment-entrusted factory specifications information database 34 as in the case of the step 307, to be subsequently inputted to the treatment procedure decision means 4.

(Step 310: Selection of the information concerning a shredder from the information of the facilities of the treatment-entrusted factory)

In the above-mentioned step 307 or 309, the information concerning the shredder (treatable dimensions or sizes or the like) is selectively extracted from the inputted information concerning the facilities of the treatment-entrusted factory (see FIG. 11) in the abovementioned step 307 or 309.

This is because almost all of the component parts (except for these having harmful material/substance are destined to be finally crushed in the treatment processing system.

Accordingly, some of the component parts may be reused or discarded intact although it depends on the applications for which the treatment processing system is designed to be employed.

(Step 311: Decision as to whether remainders left after detachment of the component parts to be segregated can be crushed without any further treatment)

The information concerning the dimensions/sizes of the remainders left after the detachment of the component parts to be segregated (or the information concerning the dimension of the manufactured article itself when it is decided that no component part to be separated exists) is determined on the basis of the information concerning the manufactured article as read out in the step 301 and compared with the above-mentioned information concerning the shredder (treatable dimensions, sizes, etc.) selectively extracted in the step 301, for making decision as to:

(1) whether or not the remainders can be charged in the shredder intact, and (2) whether a cutting process is required as the pretreatment.

When it is decided that the remainders can be charged into the shredder, the processing proceeds to a step 312, while in case the pretreatment is required, the processing proceeds to a step 313.

In the case where the manufactured article shown in FIG. 18 is to be treated in the treatment-entrusted factory shown in FIG. 11, the dimensions of the remainders left after the detachment of the printed circuit board assembly 213 can be determined on the basis of the information concerning the manufactured article (dimensional information shown in FIG. 19 and the disintegration procedure information shown in FIG. 20 in more concrete).

As a result, there will be left a portion (housing) of 270±30×500×150, portions (housing, cover and screw) of 230±30×500×150, and a portion (cover) of 230±30×500×30, respectively.

The above-mentioned dimension information is compared with the dimensions treatable by an ordinary shredder as contained in the facility information shown in FIG. 11, as a result of which decision is made that all the three portions mentioned above can be charged into the shredder.

(Step 312: Determination of locations for cutting on the basis of the information concerning the manufactured article)

On the basis of the dimensional information of the remainders left after the detachment of the component parts to be segregated and the information concerning the dimension or size treatable by the shredder, the locations for cutting in precedence to the shredding are determined.

Figure 21:
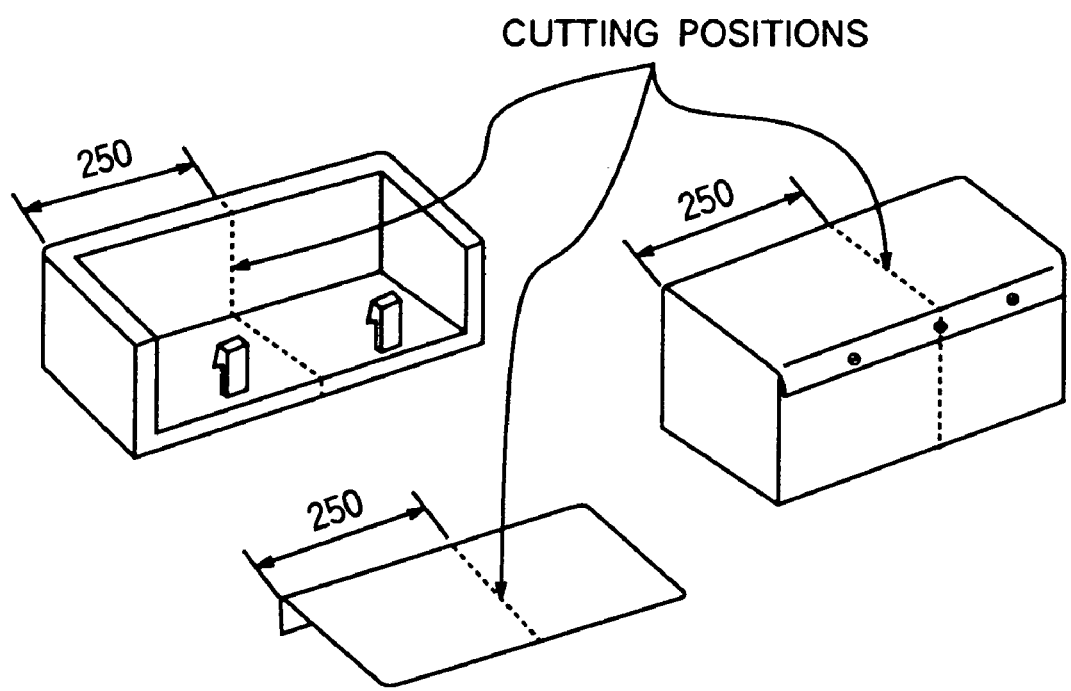
FIG. 21 is a view showing a remainder left after detachment of a printed circuit board assembly and a location at which the remainder is to be cut.

In the case where the manufactured article shown in FIG. 18 is to be treated in the treatment-entrusted factory shown in FIG. 11, it is decided that the portions are cut into halves, respectively, as shown in FIG. 21. As a method to this end, there may be mentioned a method of sequentially reducing the size to one second, one third and so forth until the dimensional requirement for charging in the shredder can be met.

(Step 313: Outputting of the treatment procedure)

On the basis of the results of the decisions described so far, the treatment procedure for treating the manufactured article 21 is generated to be outputted.

More specifically, the treatment procedure is generated by adding to the shredding treatment procedure the undermentioned work procedures as the pretreatment procedure preceding to the charging in the shredder.

(1) A separation procedure in case the component parts to be separated exist.

(2) A cutting procedure when cutting is required in precedence to the shredding.

In the case where the manufactured article shown in FIG. 18 is to be treated in the treatment-entrusted factory shown in FIG. 11, the procedure is determined to be outputted in such a manner as mentioned below:

"Since the manufactured article now of concern contains the harmful part (printed circuit board assembly presence of lead), detachment and recovery are to be realized in accordance with the procedures mentioned below:

(1) The manufactured article is cut into halves by a cutter.

(2) From one half resulting from the cutting, the cover and then the printed circuit board assembly are separated. Since the printed circuit board assembly is secured at two locations by the snap-fit claws, the latter are so deformed as to allow the printed circuit board assembly to be released, whereon the separated printed circuit board assembly is accommodated in a board recovery box.

(3) Since the three different type portions can not be crushed intact, each of them is cut into halves.

(4) Fragments resulting from the cutting are crushed by an ordinary shredder."

An example of such output is illustrated in FIG. 22.

It goes without saying that the output format is not restricted to the above but any suitable output format can be adopted so for as the contents determined through the processing flows described above can be comprehended.

Next, description will be directed to an exemplary processing for determining and outputting a treatment procedure including separation procedures for separation component parts from an article subjected to treatment by a facility except for those which can not meet the capability conditions of the facility.

FIG. 13 illustrates in a flow chart a processing for generating/outputting the treatment procedure for a manufactured article as executed by the treatment procedure decision means 4 of the treatment processing system according to the instant embodiment of the invention. In the following, description will be made orderly.

(Step 321: Reading/inputting of the information concerning the manufactured article)

The information concerning the manufactured article 21 is first read out not only from the information affixed to the manufactured article 21 but also from the article specifications information database 31 when occasion requires, whereon the information as read out is inputted to the treatment procedure decision means 4 similarly to the case of the processing flow illustrated in FIG. 12.

(Step 322: Selection of the information concerning the component parts constituting the manufactured article)

Next, as a preparation for making decision as to whether the component parts of the manufactured article of concern contain any component parts to be separated, the information concerning the component parts constituting the manufactured article of concern (part names, part Nos., materials/substances and the like) is selectively extracted from the above-mentioned manufactured article information as inputted.

(Step 323: Reading/inputting of the information concerning the facilities of the treatment-entrusted factory)

Next, the information concerning the facilities of the treatment-entrusted factory (see FIG. 11) is read out from the treatment-entrusted factory specifications database 34 and inputted to the treatment procedure decision means.

(Step 324: Selection of conditions of the treatment-destined objects for the facilities of the treatment-entrusted factory)

In succession, the conditions of the treatment-destined objects for the facilities of the treatment-entrusted factory (part names, materials/substances, etc.) are selectively extracted from the above-mentioned inputted information concerning the facilities of the treatment-entrusted factory.

For example, when an ordinary shredder is made use of as one of the facilities which the factory is equipped with, the treatment-destined objects for the shredder will be other than the harmful material/substance, the hazardous material/substance and metal blocks. Accordingly, when the component parts such as metal parts or blocks are present in the manufactured article, such a separation procedure is adopted for separation the component parts such as metal pieces or blocks from the manufactured article in precedence to the charging or loading in the shredder and the information thereof is stored in association with the facilities information.

(Step 325: Decision as to whether the component parts to be separated is contained in the manufactured article)

In succession, the above information concerning the component parts extracted selectively is compared with the information concerning the facilities of the treatment-entrusted factory for determining presence or absence of the component parts to be separated. When this decision results in presence, the processing proceeds to a step 326 while proceeding to a step 328, if otherwise.

(Step 326: Extraction of the information concerning the locations or positions of the component parts to be separated, part names, materials/substances, separation procedure, etc.)

The information concerning the locations or positions, the part name, the materials/substances of the component parts to be separated, the separation procedure, etc. is extracted from the above-mentioned information concerning the manufactured article as read out.

(Step 327: Determination of the separation procedure by taking into account the information concerning the facilities of the treatment-entrusted factory)

The separation procedure information for the component parts to be separated as read out in the step 326 is compared with the information concerning the facilities of the treatment-entrusted factory read out in the step 323, to thereby determine the treatment procedure which can be executed with the facilities installed in the treatment-entrusted factory and which involves low cost in the treatment.

More specifically, the treatment procedures for separation the component parts of metal material is stored in association with the facilities information. Accordingly, when the ordinary shredder is made use of, the procedure suited for separation the metallic component parts is selected. Further, when a plurality of such separation procedures are available, the procedure involving the lowest cost in the treatment is selected.

A method of calculating the treatment cost is similar to that described hereinbefore by reference to FIG. 12.

Subsequently, similarly to the flow of processings illustrated in FIG. 12, the information concerning the shredder is selected from the information concerning the facilities which the treatment-entrusted factory is equipped with (step 328), whereon decision is made as to whether the remainders left after the detachment of the component parts to be segregated can be crushed intact (step 329) while the locations where the component part(s) is to be cut or sheared is determined on the basis of the result of the above decision (step 330). The treatment procedure thus determined is then outputted (step 331).

Next, referring to FIG. 14, description will be made of an exemplary processing for determining discriminatively valuable component part(s) to be segregated from the manufactured article being subjected to the treatment and deciding a treatment procedure covering the separation procedure for the valuable things and to be outputted.

FIG. 14 illustrates in a flow chart the processings for generating and outputting a treatment procedure for a manufactured article by the treatment procedure decision means 4 of the treatment processing system according to the instant embodiment of the invention. The flow of the processing is substantially similar to that shown in FIG. 12 except for the respect that the cost involved in separation the valuable things is compared with the dealing price on the market to thereby decide whether or not the valuable things are to be separated. In the following, description will be made orderly.

Processings for reading/inputting of the information concerning the manufactured article (step 341) and selecting the information concerning the component parts constituting the manufactured article (step 342) are similar to those illustrated in FIG. 12. Thus, description therefor will be omitted.

(Step 343: Reading/inputting of the information concerning valuable things)

Next, the information concerning the valuable things (see FIG. 10) is read out from the market information database to be inputted to the treatment procedure decision means. (Step 344: Selection of the information concerning component parts and materials/substances which are variable things)

Subsequently, the information concerning the parts and the materials which are the valuable things (material/substance names, material/substance numbers, part names, part numbers, purchase prices and the like) is selectively extracted from the above-mentioned inputted information concerning the valuable things.

(Step 345: Decision as to presence or absence of the component parts containing valuable things)

In succession, the information concerning the above-mentioned component parts as extracted selectively is compared with the information concerning the parts and the materials of the above-mentioned valuable things as extracted selectively, to thereby make decision as to whether or not there exists the component part(s) which are the valuable things. If the above decision results in affirmation, the processing proceeds to a step 346, and if otherwise, the processing proceeds to a step 347.

(Step 346: Extraction of the information concerning the locations/positions of the component parts containing valuable things, part names, materials/substances, separation procedure, purchase prices, etc.)

The information concerning the locations/positions, the part name, the materials/substances of the parts to be separated, the disassembling procedure, etc. is extracted from the above-mentioned information concerning the manufactured article as read out.

(Step 347: Reading/inputting of the information concerning the facilities of the treatment-entrusted factory)

Next, the information concerning the facilities of the treatment-entrusted factory which is in charge of treatment is read out from the treatment-entrusted factor specifications database 34 and inputted to the treatment procedure decision means.

(Step 348: Calculation of the cost involved in the work for separation the component parts containing the valuable things)

Next, on the basis of the information concerning the component parts containing valuable things as extracted and the information concerning the cost involved in the treatment to be carried out in the treatment-entrusted factory as inputted as mentioned above, the cost involved in the work for separation the component parts is arithmetically determined or calculated. This processing can be realized in accordance with the concept similar to that underlying the work cost calculation processing described hereinbefore in conjunction with the processing flow illustrated in FIG. 12.

(Step 349: Decision as to whether or not the component parts containing the valuable things are to be separated)

Subsequently, the work cost involved in separation the component parts containing the valuable things as calculated in the manner mentioned above is compared with the purchase price information of the component parts containing the valuable things as extracted as mentioned above, to thereby make decision as to whether or not the component parts containing the valuable things worthy to be separated are present or not by deciding whether or not such detachment of the parts is profitable to the treatment-entrusted factory.

For realizing the decision with higher accuracy, cost for stocking, cost for transportation and other costs should be taken into consideration in the decision of the cost for the separation work. The information concerning these costs should be stored in the treatment-entrusted factory specifications database 34 and the market information database.

(Step 350: Extraction of the information concerning the locations/positions of the component parts to be separated, part names, materials/substances, separation procedure, etc.)

Subsequently, the information concerning the locations/positions of the parts to be separated, the part names, the materials/substances of the parts, the separation procedure and others is extracted from the information concerning the manufactured article as read out as mentioned above.

The succeeding processings for selecting the information concerning the shredder from the information concerning the facilities of the treatment-entrusted factory (step 351), making decision as to whether the remainders left after the detachment of the component parts to be segregated can be crushed intact (step 352), determining the location where the component part(s) is to be cut or sheared on the basis of the information concerning the manufactured article (step 353), and outputting the treatment procedure are essentially same as the processing flow described hereinbefore by reference to FIG. 12. Accordingly, any further description of these processings will be unnecessary.

The foregoing description has been directed to the exemplary cases in which the treatment procedures for the discarded articles are decided and outputted for issuing pertinent commands to the worker(s) or for controlling the facilities or equipment installed in the treatment-entrusted factory in precedence to the actual treatment of the discarded articles in the factory.

Now, description will turn to a treatment processing system which is designed to alter the treatment procedure decided and outputted precedingly by the treatment processing systems according to the exemplary embodiments described above, to thereby generate other treatment procedure for outputting commands to the worker(s) or for controlling the facilities so that the treatment can be performed in accordance with the treatment procedure as generated after the alteration.

The object to be dealt with the treatment processing system according to the present invention is manufactured articles discarded as waste. Naturally, the discarded articles collected to the treatment-entrusted factory assume different states from one to another. Even the articles of a same model manufactured by a same manufacturer may often assume different states when collected as the discarded articles in dependence on the environments in which they have been used or operated. By way of example, the manufactured article used outdoors such as a washing machine or the like is degraded in respect to the degree of rust on the armor and the screws when compared with the washing machine used indoors. Besides, the washing machines used outdoors in the seaside areas are degraded with regard to the rust state when compared with the washing machines used in the inland areas. Additionally, the reasons why the manufactured articles have been discarded may differ from one to another. For example, some of the manufactured articles may have been discarded because of destruction while others may have been discarded because the performance thereof are no more to be satisfied. To say in another way, the manufactured articles may be discarded for the various reasons differing from one to another article.

Figure 23:
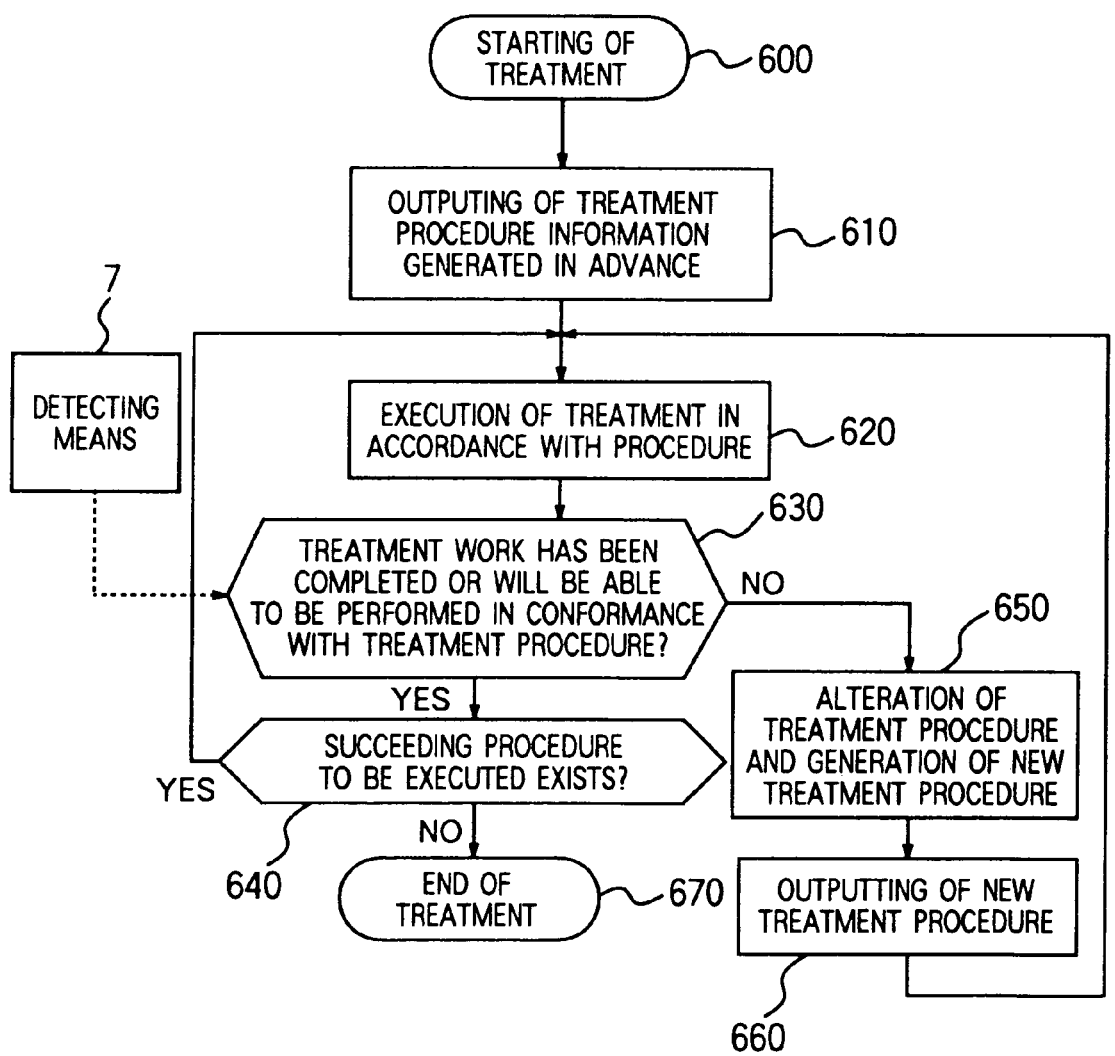
FIG. 23 is a flow chart for illustrating a processing for altering and outputting a treatment procedure according to the present invention.

FIG. 23 is a flow chart for illustrating a processing for altering the treatment procedure according to another aspect of the present invention.

(Step 600)

Treatment of discarded articles as transported to the treatment-entrusted factory is started.

(Step 610)

The treatment procedure information generated in advance by the treatment procedure decision means 4 in accordance with the methods described hereinbefore Ts outputted through the output means 5.

(Step 620)

In conformance with the treatment procedure outputted in the step 610, the treatment of the manufactured article 21 is carried out. It should, however, be noted that the treatment is executed on a procedure-by-procedure basis.

(Step 630)

Through the medium of a detecting means 7, it is checked whether the relevant work has been completed or will be able to be performed in conformance with the treatment procedure. In case the instant decision step results in "YES" (when it is decided that the work has been completed or will be able to be performed in conformance with the treatment procedure), the processing proceeds to a step 640, whereon a succeeding procedure is executed.

On the other hand, when the above decision step results in "NO" (when it is decided that the works could not be carried out in conformance with the treatment procedure), the processing proceeds to a step 650 where the treatment procedure is altered.

(Step 640)

In this step, decision is made as to whether the succeeding procedure to be executed exists or not. In the event the succeeding procedure to be executed exists, then return is made to step 620 to execute the succeeding procedure. On the other hand, in the event the succeeding procedure does not exist, the operation proceeds to step 670 for the end of treatment so that the processing is terminated.

(Step 650)

Unless the treating works could not be carried out in conformance with the treatment procedure as generated, the procedure is altered or changed to another procedure in this step, to thereby generate a renewed treatment procedure.

(Step 660)

The renewed treatment procedure generated in the above-mentioned step 650 is outputted to the output means 5.

Figure 24:
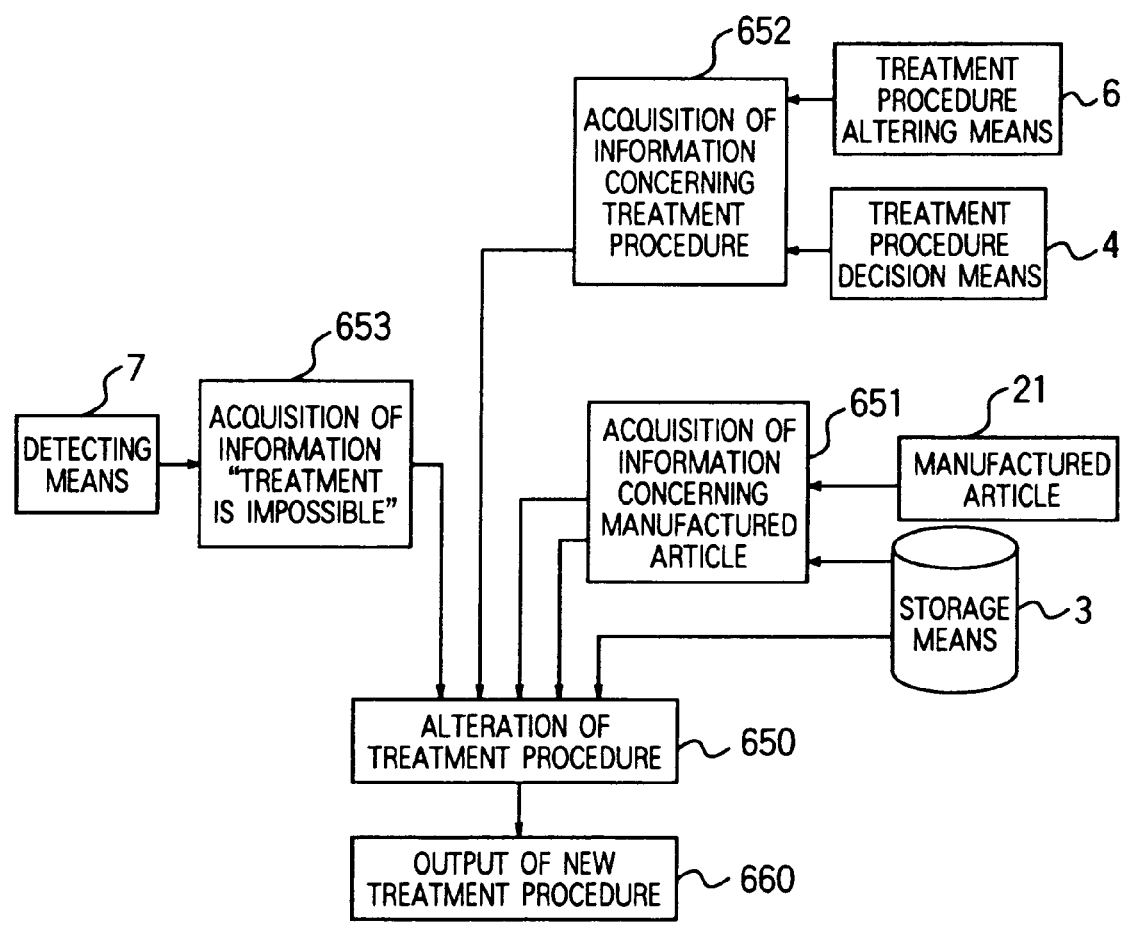
FIG. 24 is a flow chart for illustrating schematically a processing for altering a treatment procedure and information required for treatment.

FIG. 24 shows in a flow chart schematically a processing for altering a treatment procedure together with information required for the treatment in the system according to the instant embodiment of the present invention.

Description will be made by following orderly the schematically illustrated flow of processings (step 653).

(Step 653)

Through the detecting means 7, information is outputted that the treatment of the manufactured article can not be carried out in conformance with the treatment procedure as outputted.

(Step 652)

The information concerning the treatment procedure detected as being impossible to execute in the step 653 is acquired from the treatment procedure decision means 4 or a treatment procedure altering means 6.

In the case where the procedure information has been generated previously, this information is obtained from the treatment procedure decision means 4, while in the case of the treatment procedure generated after the alteration, the information is obtained from the treatment procedure altering means 6.

(Step 651)

On the basis of the available information concerning the manufactured article affixed to the article 21 currently subjected to the treatment and additionally on the basis of the information concerning the manufactured article affixed to the article 21, if necessary, the information concerning the above-mentioned manufactured article is acquired from the storage means 3 in which the information concerning various manufactured articles has been previously stored.

(Step 650)

On the basis of the information concerning the treatment procedure as acquired in the step 652, it is decided for what purpose the procedure detected as being irrelevant has been intrinsically generated. To this end, it will be required to store the information concerning the purposes of the works involved in the treatments in correspondence to the treatment procedures, respectively.

The purposes mentioned above may be roughly classified as follows. In this conjunction, it should be mentioned that the method of generating the alternative treatment procedures may differ in dependence on the purposes as intended.

(1) For the purpose of separation harmful/hazardous materials/substances.

In this case, the harmful/hazardous materials/substances must necessarily be separated or removed by resorting to an alternative procedure.

It is preferred that when a plurality of alternative procedure candidates are generated or inputted by or from the treatment procedure altering means 6, the treatment costs involved in execution of the individual procedures are arithmetically determined, to thereby select the procedure for which the cost is lowest.

(2) For the purpose of separation the parts incapable of being treated with the facilities installed in the treatment-entrusted factory (By way of example, a metal block such as a compressor of a refrigerator can not be crushed with the ordinary shredder, and thus the treatment by the shredder dedicated thereto is required. For this reason, such metal block is not crushed but separated or dismounted.)

In this case, when a plurality of alternative procedure candidates are generated or inputted by or from the treatment procedure altering means 6, it is preferable that the costs involved in execution of the individual procedures are arithmetically determined, to thereby adopt the procedure for which the cost is lowest.

As a typical example of the alternative procedure, there may be mentioned a method of shredding a semi-disassembled article appearing in the course of treatment or the article to be treated en bloc (such treatment may be entrusted to a factory equipped with compatible facilities). In this case, it will be necessary to confirm that no harmful/hazardous materials/substances are contained in the semi-integrated article or the article mentioned above on the basis of the information concerning the manufactured article obtained in the step 651 or the information concerning the treatment procedure acquired in the step 652.

(3) For the purpose of separation variable things

In this case, decision should be made on the basis of the information concerning the purchase prices of the valuable things and the cost involved in the separation treatments according to the alternative procedure as to whether or not profit can be brought about to the treatment-entrusted factory. Further, in the case where a plurality of alternative profitable procedures are available, the procedure which can ensure highest profit should be selected. On the other hand, unless there is available any profitable procedure, it may be decided that the valuable things of concern can not be separated.

As described above, the alternative procedures are determined on a purpose-by-purpose basis. Methods or processings to this end will be described below.

(1) Extraction of the alternative procedure from the part separation procedure information contained in the information concerning the manufactured article The part separation procedure is extracted from the information concerning the manufactured article, which information has been read out from the manufactured article subjected to the treatment or read out from the storage means 3, as occasion requires, to thereby decide the presence or absence of the alternative procedure, if the alternative procedure I present, the procedure as found is selected as the candidate for the alternative procedure. Parenthetically, concerning the examples of the separation procedure information, reference may be made to "D DESIGN INFORMATION (3), PART Separation PROCEDURE" shown in FIG. 20.

(2) Determination of the position for cutting

Unless the candidate for the alternative procedure is found from the part separation procedure information in the processing described in the above paragraph (1), the part of concern is separated by cutting. To this end, undermentioned methods or processings may be adopted.

(a) On the basis of the location information and the dimensional information concerning the part to be separated as extracted from the above-mentioned information concerning the manufactured article as read out, the position or location at or along which the part of concern can be cut without being impaired is determined. Parenthetically, as to the examples of the location or position information and the dimensional information of the part(s) to be separated as contained in the above-mentioned information concerning the manufactured article read out, reference may be made to "C DESIGN INFORMATION (2), DIMENSIONAL INFORMATION", shown in FIG. 19. (b) In this conjunction, it should be mentioned that the determination of the cutting position mentioned above can be realized after having confirmed that any other part of harmful/hazardous material/substance are absent in the article or semi-disassembled article being subjected to the treatment by making decision as to presence or absence of the part of harmful/hazardous material/substance.

When the presence of other part(s) of harmful/hazardous material/substance is decided, the position or location information and the dimensional information of the part of harmful or hazardous material/substance as decided are extracted from the above-mentioned information concerning the manufactured article as read out, as in the case of the processing described in the above-mentioned paragraph (a), whereupon the location information and the dimensional information of the part to be separated is extracted to thereby determine the position at or along which the part of concern as well as the part of harmful or hazardous material/substance can be cut without being damaged. In that case, the cutting area is also calculated.

(Step 660)

The alternative treatment procedure information determined in the step 650 is outputted through the output means 5. In the even there is no procedure to be processed in step 640, then the process is terminated.

(Step 670)

Figure 25:
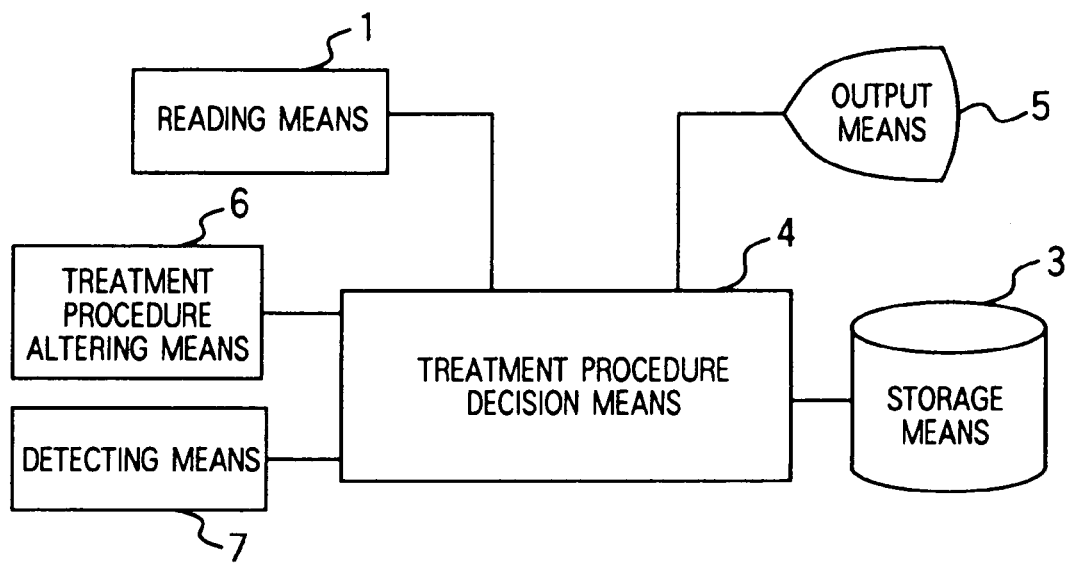
FIG. 25 shows schematically and generally a configuration of a manufactured article treatment processing system according to the instant embodiment of the invention.

FIG. 25 shows schematically and generally a configuration of a manufactured article treatment processing system according to the instant embodiment of the invention.

The manufactured article treatment processing system according to the instant embodiment of the invention is comprised of a reading means I for reading the information affixed to a manufactured article being subjected to the treatment, a storage means 3 for storing a database of the information required for treating the manufactured article, a treatment procedure decision means 4 for deciding a treatment procedure for the manufactured article of concern by referencing the information concerning the treatment of the manufactured article as contained in the database stored in the abovementioned storage means 3 on the basis of the information affixed to the manufactured article which is read out by the reading means 1, an output means 5 for outputting the result of the decision made by the above-mentioned treatment procedure decision means 4 about the discarded article of concern, a treatment procedure altering means 6 for altering or modifying the treatment procedure outputted, to thereby determine an alternative procedure, and a detecting means 7 for detecting whether or not treatment could be performed in accordance with the treatment procedure determined by the treatment procedure decision means 4 or the treatment procedure altering means 6.

Figure 26:
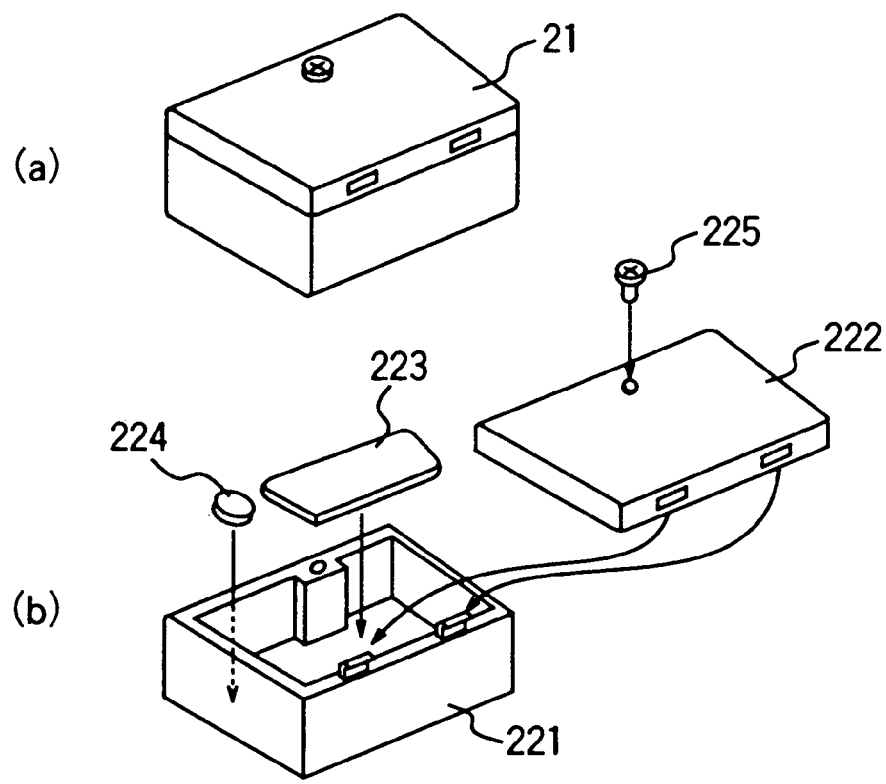
FIG. 26 shows an outer appearance and developed state of a manufactured article, by way of example.

Now, by taking as example the manufactured article 21 shown in FIG. 26, description will be directed to a method of altering the treatment procedure in the treatment processing system according to the instant embodiment of the invention.

FIG. 26(*a*) shows an outer appearance of a manufactured article 21 taken as a concrete example. FIG. 26 (*b*) shows a structure of the article in a developed state. As can be seen in FIG. 26, the manufactured article now under consideration is composed of five parts. Namely, they are a box-like housing 221, a cover 222, a printed circuit board 223, a cell 224 and a screw 225.

FIG. 27 illustrates the treatment procedures for the above-mentioned manufactured article, which procedures have been decided in advance by the treatment procedure decision means 4. The treatment procedures are decided and outputted according to the method similar to those described hereinbefore in conjunction with the preceding embodiments of the invention. As can be seen in FIG. 27, there exist the treatment procedures mentioned below.

(1) Detachment of the screw (2) Removal of the cover (3) Detachment of the cell and the printed circuit board The purpose of the processings now of concern is to separate and separate or segregate the cell (containing mercury) and the printed circuit board (containing lead) which are harmful parts.

Figure 28:
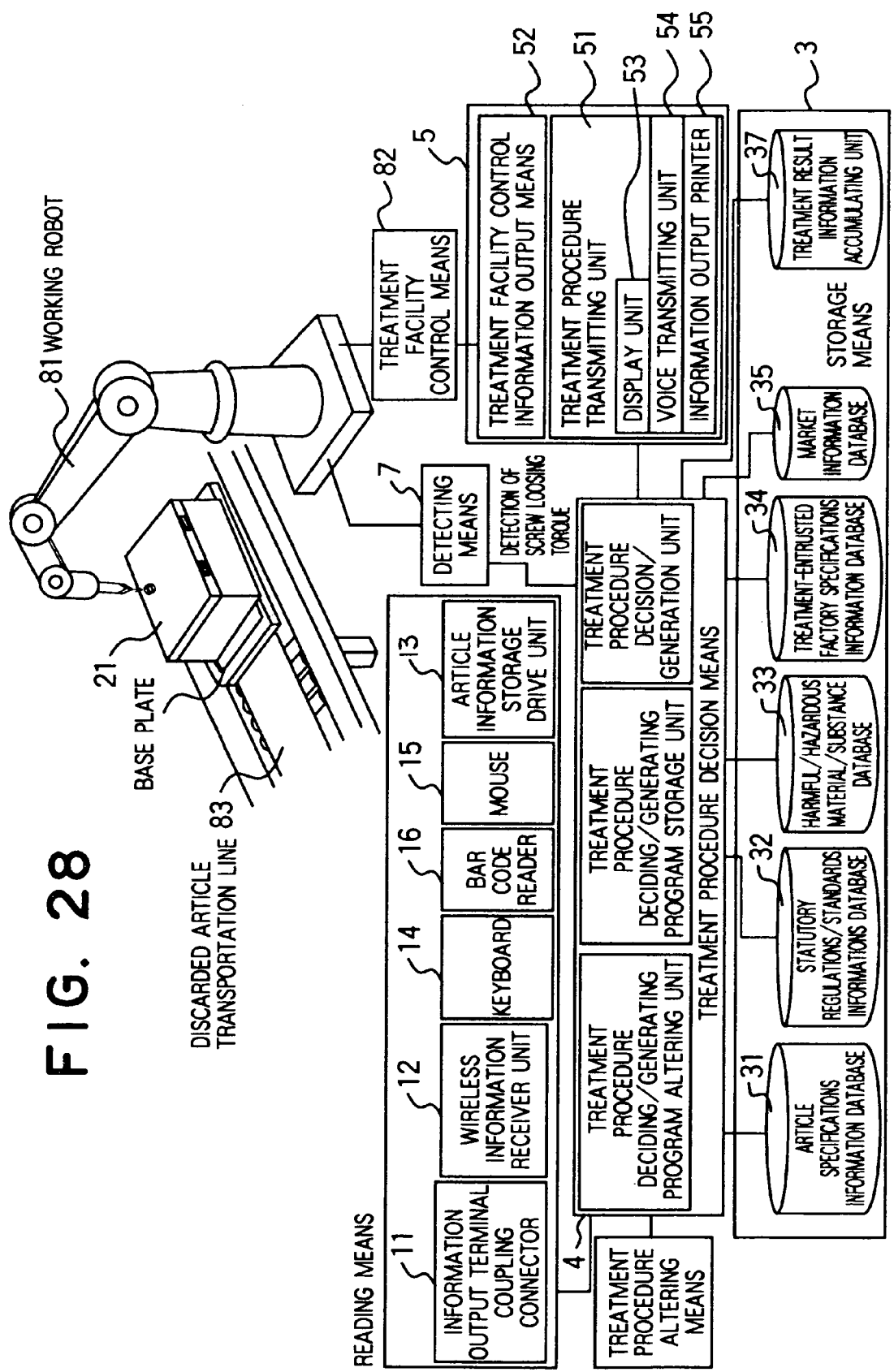
FIG. 28 shows pictorially field of treatment in a treatment-entrusted factory.

FIG. 28 shows pictorially the treatment of the manufactured article 21 in a treatment-entrusted factory.

The treatment procedure determined in advance by the previously mentioned treatment procedure decision means 4 is outputted to a treatment facility control means 82 as the treatment facility control information from a treatment facility control information output means 52 incorporated in the output means 5, for thereby controlling a working robot 81. It is shown that the working robot 81 is about to separate the screw 225 of the manufactured article 21 being subjected to the treatment in conformance with the treatment procedure mentioned above.

The working robot mentioned above 81 is equipped with the detecting means 7 for monitoring a screw loosing torque of the working robot 81. When it is detected by the detecting means 7 that the screw can not be separated even with a screw loosing torque of magnitude greater than a predetermined value, the detecting means 7 sends to the treatment procedure altering means 6 the information "work can not be performed in conformance with the treatment procedure; removal of screw is impossible". In response thereto, the treatment procedure altering means 6 acquires from the treatment procedure decision means 4 mentioned previously the information concerning the intrinsic purpose of the work which could not be carried out, to thereby decide that the work is "the work for segregating a harmful material" and acquires the information that the parts containing the harmful material/substance are the cell and the printed circuit board.

In view of the imposed condition that in the case of the manufactured article containing parts of harmful material/substance, the latter must be segregated without fail, the treatment procedure altering means 6 extracts the information concerning the part separation procedure from the information concerning the manufactured article as read out from the above-mentioned manufactured article 21 being subjected to the treatment or from the article specifications information database 31, as occasion requires, to thereby make decision as to presence or absence of the alternative procedure (concerning the example of the part separation procedure, reference may be made to "D DESIGN INFORMATION (3), PART Separation PROCEDURE" shown in FIG. 20). When the alternative procedure is present, it is selected as the candidate for the alternative procedure to thereby generate another separation method or procedure (method by cutting). On the basis of the location information and the dimensional information concerning the part to be separated as extracted from the above-mentioned information read out, the position or the location at or along which the part of concern can be cut without being impaired is determined—Parenthetically, as to examples of location or position information and the dimensional information of the part(s) to be separated as contained in the above-mentioned information concerning the manufactured article as read out, reference may be made to "C DESIGN INFORMATION (2), DIMENSIONAL INFORMATION" shown in FIG. 19.

In this way, the above-mentioned treatment procedure altering means 6 reads out or generates one or more alternative procedures.

Subsequently, the above-mentioned treatment procedure altering means 6 arithmetically determines the costs involved in the treatments for the alternative treatment procedures, respectively, to thereby determine the procedure for which the treatment cost is lowest. To this end, the following methods or processings are adopted, as in the case of the embodiments described hereinbefore.

(1) Calculation of the treatment cost required for the alternative procedure acquired from the part separation procedure information mentioned previously The part separation procedure information (refers to FIG. 20, "D DESIGN INFORMATION (3)") is acquired from the article specifications information read out as mentioned previously or acquiring the treatment work cost information from the treatment-entrusted factory specifications information (see FIG. 11) mentioned previously, to thereby calculate the treatment cost required for the alternative procedure acquired from the above-mentioned part separation procedure information.

(2) Calculation of the treatment cost required for the alternative procedure including the cutting process as generated by the above-mentioned treatment procedure altering means 6.

On the basis of the information concerning the cutting area computed as mentioned previously as well as the information concerning the work cost involved in the catting treatment as acquired from the treatment-entrusted factory specifications information (see FIG. 11), the treatment cost required for the alternative procedure acquired from the above-mentioned part separation procedure information is calculated.

(3) The costs involved in the treatments through the alternative procedure candidates as calculated in accordance with the methods mentioned above are compared with one another, to thereby determine the most inexpensive procedure.

Subsequently, the above-mentioned alternative procedure as determined is outputted to the treatment facility control means 82 by way of the treatment facility control information output means 52. By way of example, in case the determined alternative procedure is a treatment procedure resorting to the cutting, the treatment facility control means 82 so controls a transportation line 83 as to transport the manufactured article 21 of concern to a process section where a cutter can be used, whereupon the work by the cutter is carried out.

It is to be mentioned that as one of the storage means 3, a treatment result information accumulating unit 37 is provided for storing accumulatively the information concerning the treatment results such as the information about the treatment procedures executed actually for the manufactured articles treated in the treatment-entrusted factory together with or in association with the codes indicating the manufactured articles (such as manufactured article name, manufacturer name, model, manufacture number, manufactured date and the like). By virtue of provision of the treatment result information accumulating unit 37 as mentioned above, it is possible to realize a function for adding accumulatively to the separation procedure information of the manufactured article as stored in the article specifications information database 31 the information concerning the alternative procedures adopted in place of the standard procedures which could not be executed, as elucidated above. Furthermore, when the situations described above occurs increasingly for the manufactured articles of the same model (e.g. when a counted ratio of the number of times the alternative procedure has bee adopted in place of the standard procedure exceeds 50%), such function can be realized in conjunction with the manufactured article separation procedure information of the article specifications information database 31 that the altered procedure is outputted with higher priority. Thus, the treatment can be accomplished at high rate.

Figure 29:
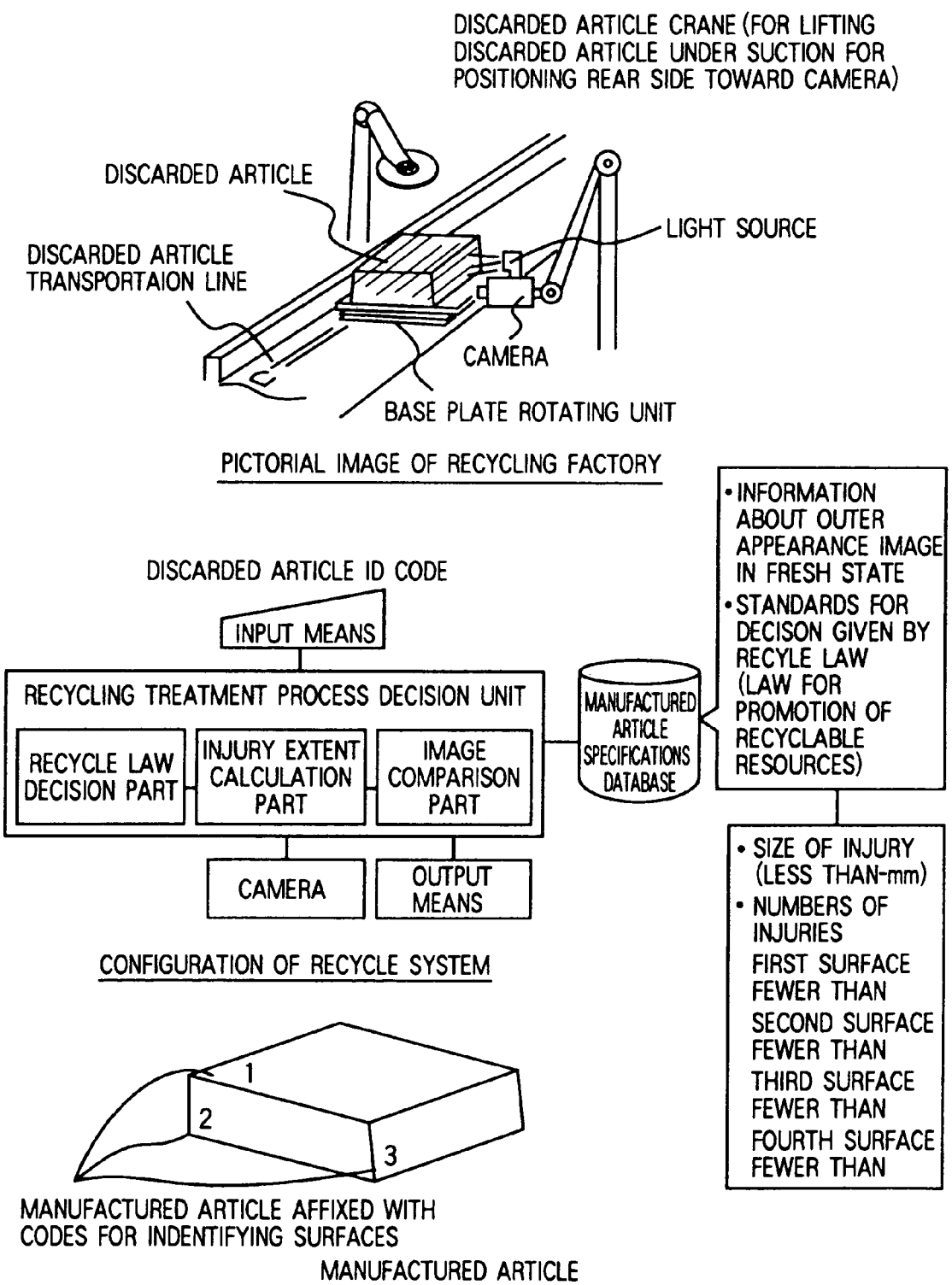
FIG. 29 shows pictorially a treatment field together with an exemplary system configuration and an example of a manufactured article treated by the system as shown.

FIG. 29 shows another exemplary embodiment of the invention. In the case of the system illustrated, the detecting means 7 is constituted by a unit including an image pick-up device such as a television camera, it is assumed that the state of the manufactured article being subjected to the treatment is checked by making use of the image information picked up by the television camera. To this end, there is stored in the manufactured article specifications information database the image information of the discarded article in the fresh state thereof. With the treatment processing system, the model and other particulars of the discarded article of concern are identified for acquiring from the article specifications information database mentioned previously the image information of the article when it was in the fresh state and the specifications information admitting the parts thereof to be reused (check standards, which represents, for example, the reference information stored in element 36 of FIG. 6 which provides standards with respect to whether the article can be recycled from the viewpoint of wear or abrasion of the article material). In succession, check is performed by comparing the image information of the discarded article and the image information thereof in the fresh state. From the image information, the number of injuries and sizes thereof, for example, can be detected. In this conjunction, it is required that the manufactured article be provided with some measures for allowing a front wall, a top wall or surface thereof to be discriminatively identified. By way of example, some manufactured article may have individual walls or surfaces affixed with identifier numbers, respectively. In the treatment processing system, the information concerning the number of injuries and the sizes thereof as detected is compared with the specifications information admitting the reuse of the parts (check standards), whereby the treatment method is decided and thus the treatment procedure can be determined. By way of example, when it is decided that reuse as the component part is impossible because of a large number of injuries, then a treatment procedure for recycling as the material or substance may be generated and outputted.

INDUSTRIAL APPLICABILITY

As can be appreciated from the foregoing description, with the treatment processing system according to the present invention, proper and appropriate treatments for discarded articles can be determined and executed. Thus, the present invention provides a great contribution to the reduction in consumption of effective energy, decrease in the amount of discarded articles and prevention of environmental detriment due to harmful materials/substances or the like.

Further, by referencing the treatment procedure decision/determination processings or methods according to the present invention at the stage of design, it is also possible to promote designing of articles which are ready to undergo the recycling treatments.

We claim:

1. A discarded article treatment processing method, comprising the steps of:

treating the discarded article on the basis of a selected treatment procedure for separating parts incapable of being treated by facilities installed in a treatment-entrusted factory which is in charge of treatment of said discarded article, or for segregating harmful or hazardous material to be separated;

monitoring a situation in which said discarded article is being treated and checking whether relevant work has been completed or will be able to be performed in conformance with the selected treatment procedure through a medium of a detecting means;

reading out, from information concerning separation procedures for taking out the parts, harmful or hazardous material from the discarded article, the information concerning the facility or equipment demanded for the execution of the separation procedures and the information concerning equipment or facilities installed in the treatment-entrusted factory, in case it is decided that said treating situation suffers abnormality;

determining an alternative treatment procedure serving for a same purpose as selected treatment procedure on the basis of the information acquired in the reading out step;

determining the position or location at or along which the parts, harmful or hazardous material can be cut and separated from said discarded article without being impaired on the basis of the location information and the dimensional information concerning the parts, harmful or hazardous material, in case it is decided that the candidate for the alternative treatment procedure is not found;

treating said discarded article in accordance with said determined alternative treatment procedure or separating the parts, harmful or hazardous material by cutting.

2. A discarded article treatment processing method as set forth in claim 1, wherein said facility information required for executing said alternative treatment procedure contains information concerning facility operating costs;

said step of selecting said treatment procedure includes the steps of:

determining, arithmetically, overall operating costs involved in carrying out said alternative treatment procedures, respectively; and selecting an alternative treatment procedure which is lowest with regards to said overall operating cost determined arithmetically.

3. A discarded article treatment processing method as set forth in claim 1, wherein the detecting means monitors a screw loosing torque and detects that the screw cannot be separated even with a screw loosing torque of magnitude greater than a predetermined value.

* * * * *

UNITED STATES PATENT AND TRADEMARK OFFICE
CERTIFICATE OF CORRECTION

PATENT NO.        : 7,379,788 B1
APPLICATION NO.   : 09/621054
DATED             : May 27, 2008
INVENTOR(S)       : Suzuki et al.

It is certified that error appears in the above-identified patent and that said Letters Patent is hereby corrected as shown below:

On the Title Page

The asterisked (*) Notice should read as follows:

Item (*) Notice:   Subject to any disclaimer, the term of this patent is extended or adjusted under 35 USC 154(b) by 965 days.

<u>This Patent is subject to a terminal disclaimer.</u>

Signed and Sealed this

Second Day of June, 2009

JOHN DOLL
*Acting Director of the United States Patent and Trademark Office*